United States Patent
Rasmus et al.

(10) Patent No.: US 11,048,012 B2
(45) Date of Patent: Jun. 29, 2021

(54) FORMATION CHARACTERIZATION SYSTEM

(71) Applicant: Schlumberger Technology Corporation, Sugar Land, TX (US)

(72) Inventors: John Rasmus, Richmond, TX (US); Gong Li Wang, Sugar Land, TX (US); Dean M. Homan, Sugar Land, TX (US); Natalie Uschner-Arroyo, Pittsburgh, PA (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 281 days.

(21) Appl. No.: 16/173,245

(22) Filed: Oct. 29, 2018

(65) Prior Publication Data

US 2019/0129056 A1 May 2, 2019

Related U.S. Application Data

(60) Provisional application No. 62/578,185, filed on Oct. 27, 2017.

(51) Int. Cl.
*G01V 3/28* (2006.01)
*G01V 3/30* (2006.01)
*G01V 3/38* (2006.01)

(52) U.S. Cl.
CPC .......... *G01V 3/28* (2013.01); *G01V 3/30* (2013.01); *G01V 3/38* (2013.01)

(58) Field of Classification Search
CPC .............. G01V 3/28; G01V 3/30; G01V 3/38
See application file for complete search history.

(56) References Cited

U.S. PATENT DOCUMENTS

| | | |
|---|---|---|
| 2,163,422 A | 6/1939 | Church |
| 3,849,646 A | 11/1974 | McKinlay et al. |
| 3,947,683 A | 3/1976 | Schultz et al. |
| 5,440,118 A | 8/1995 | Roscoe |
| 5,471,057 A | 11/1995 | Herron |
| 6,571,619 B2 | 6/2003 | Herron et al. |
| 6,844,729 B2 | 1/2005 | Herron et al. |
| 2009/0248308 A1 | 10/2009 | Luling |
| 2009/0254283 A1 | 10/2009 | Jacobi et al. |
| 2010/0282460 A1 | 11/2010 | Stone et al. |
| 2011/0144913 A1 | 6/2011 | Klein et al. |
| 2013/0199787 A1 | 8/2013 | Dale et al. |

(Continued)

OTHER PUBLICATIONS

Pathak et al., Kerogen Swelling and Confinement: Its implication on Fluid Thermodynamic Properties in Shales, Scientific Reports, vol. 7., Article No. 12530, Dec. 1, 2017, 14 pages.

(Continued)

*Primary Examiner* — Roy Y Yi
*Assistant Examiner* — Geoffrey T Evans

(57) ABSTRACT

A formation characterization system can include a processor; memory accessibly by the processor; instructions stored in the memory and executable by the processor to instruct the system to: acquire induction measurements in a borehole in a formation using an induction tool; determine dielectric properties of the formation using the induction measurements; and generate a log that characterizes particles in the formation based on the dielectric properties.

20 Claims, 19 Drawing Sheets

(56) References Cited

U.S. PATENT DOCUMENTS

| | | | |
|---|---|---|---|
| 2014/0048694 A1 | 2/2014 | Pomerantz | |
| 2014/0090891 A1* | 4/2014 | Pitcher | E21B 49/006 175/50 |
| 2015/0022202 A1* | 1/2015 | Song | G01V 3/14 324/307 |
| 2015/0127264 A1* | 5/2015 | Hadj-Sassi | G01V 3/38 702/7 |
| 2015/0198577 A1 | 7/2015 | Williams et al. | |
| 2015/0361789 A1* | 12/2015 | Donderici | G01V 3/20 367/82 |
| 2016/0097876 A1* | 4/2016 | Freed | G01V 3/24 703/2 |
| 2016/0139293 A1 | 5/2016 | Misra et al. | |
| 2016/0186556 A1 | 6/2016 | Rasmus et al. | |
| 2016/0187521 A1* | 6/2016 | Homan | G01V 3/12 324/338 |
| 2018/0113088 A1 | 4/2018 | Misra et al. | |
| 2018/0321416 A1 | 11/2018 | Freedman | |

OTHER PUBLICATIONS

Amigun, J. O. et al., "Petrophysical analysis of well logs for reservoir evaluation: A case study of Laja Oil Field, Niger Delta", Journal of Petroleum and Gas Exploration Research (ISSN2276-650), vol. 2(10), pp. 181-187, Nov. 2012.

Barson et al., Spectroscopy: The Key to Rapid, Reliable Petrophysical Answers, Oilfield Review, Summer 2005 (20 pages).

Boyer et al., Producing Gas from its Source, Oilfield Review, Autumn 2006 (14 pages).

Bustin et al., Mechanisms of graphite formation from kerogen: experimental evidence, International Journal of Coal Geology, vol. 28, Issue 1, Oct. 1995, pp. 1-36.

Ferralis et al., Direct Correlation Between Aromatization of Carbon-Rich Organic Matter and Its Visible Electronic Absorption Edge, Carbon 88 (Jul. 2015): 139-147).

Grau et al., "A Geological Model for Gamma-Ray Spectroscopy Logging Measurements", Nuclear Geophysics, vol. 3, No. 4, pp. 351-359, 1989.

Harwood, Robert J., "Oil and Gas Generation by Laboratory Pyrolysis of Kerogen," AAPG Bulletin vol. 61, Issue 12. (Dec. 1977), pp. 2082-2102 (1977).

Herron et al., Borehole Elemental Concentration Logs Now Available: A new source of Geochemistry Data, published at http://www.Ideo.columbia.edu/res/div/mgg/lodos/Education/Logging/slides/Geochemical_logging.pdf on Apr. 4, 2008, 46 pages.

Herron et al., "Elemental Composition and Nuclear Parameters of Some Common Sedimentary Minerals," Nucl Geophysics, vol. 7, No. 3, pp. 383-406, Apr. 28, 1993.

Heubeck, Christoph, "Geochemistry, Maturation, and Migration", produced for Earth History Class at the Free University Berlin, Department of Geologican Sciences, Aug. 12, 2004 (15 pages).

Ishwar et al., "Petrophysical Well Log Analysis for Hydrocarbonexploration in parts of Assam Arakan Basin, India", Well Logging Services, ONGCL, assam pp. 1-5, 2013.

Kim, S. et al., "Graphical Method for Analysis of Ultrahigh-Resolution Broadband Mass Spectra of Natural Organic Matter, the Van Krevelen Diagram", Analytical Chemistry, vol. 75(20), pp. 5336-5344, Oct. 15, 2003.

Lewis et al., New Evaluation Techniques for Gas Shale Reservoirs, Reservoir Symposium 2004, (11 pages).

Misra et al., "Complex Electrical Conductivity of Mudrocks and Source-Rock Formations Containing Disseminated Pyrite" Unconventional Resources Technology Conference (URTeC), SPE-178650, San Antonio, Texas, USA, Jul. 20-22, 2015 (15 pages).

Misra et al., "Dielectric Effects in Pyrite-Rich Clays on Multifrequency Induction Logs and Equivalent Laboratory Core Measurements," SPWLA-2016-Z, SPWLA 57th Annual Logging Symposium, Jun. 25-29, Reykjavik, Iceland, 2016, 17 pages.

Misra et al., "Interfacial polarization of disseminated conductive minerals in absence of redox-active species—Part 1: Mechanistic model and validation," Geophysics, Mar. 2016, vol. 81, No. 2, pp. E139-E157.

Misra et al., "Interfacial polarization of disseminated conductive minerals in absence of redox-active species—Part 2: Effective electrical conductivity and dielectric permittivity," Geophysics, Mar. 2016, vol. 81, No. 2, pp. E159-E176.

Misra et al., "Laboratory Investigation of Petrophysical Applications of Multi-Frequency Inductive-Complex Conductivity Tensor Measurements," IDSPWLA-2015-Y, SPWLA 56th Annual Logging Symposium, Jul. 18-22, Long Beach, California, USA, 2015, 13 pages.

Misra et al., Complex Electrical Conductivity of Mudrocks and Source-Rock Formations Containing Disseminated Pyrite, SPE-178650-2163422-MS URTEC, Unconventional Resources Technology Conference (URTeC), San Antonio, Texas, USA, Jul. 20-22, 2015, 15 pages.

Ohtomo et al., Evidence for biogenic graphite in early Archaean Isua metasedimentary rocks, Nature Geoscience 7(1), Dec. 2013.

Pemper et al., The Direct Measurement of Carbon in Wells Containing Oil and Natural Gas Using a Pulsed Neutron Mineralogy Tool, SPE paper 124234, SPE Annual Technical Conference and Exhibition held in New Orleans, Lousiana, USA, Oct. 4-7, 2009 (14 pages).

Petersen et al., Reflectance measurements of zooclasts and solid bitumen in Lower Paleozoic shales, southern Scandinavia: Correlation to vitrinite reflectance, International Journal of Coal Geology, vol. 114, Jul. 30, 2013, pp. 1-18.

Quality of Organic Matter, PA DCNR—Geology—Quality of Organic Matter, Mar. 26, 2012 (2 pages).

Quirein et al., A Coherent Framework for Developing and Applying Multiple Formation Evaluation Models, SPWLA, 27th Annual Logging Symposium, Jun. 9-13, 1986 (17 pages).

Revil et al., Induced polarization response of porous media with metallic particles—Part 1: A theory for disseminated semiconductors, Geophysics, vol. 80, No. 5 (Sep.-Oct. 2015); pp. D525-D538.

Revil et al., Induced polarization response of porous media with metallic particles—Part 5: Influence of the background polarization, Geophysics, vol. 82, No. 2 (Mar.-Apr. 2017); p. E97-E110.

Revil et al., Induced polarization response of porous media with metallic particles—Part 6: The case of metals and semimetals, Geophysics, vol. 82, No. 2 (Mar.-Apr. 2017); p. E77-E96.

Roscoe et al., Use of GSO for Inelastic Gamma-Ray Spectroscopy Measurements in the Borehole, IEEE Transactions on Nuclear Science, vol. 39, No. 5, Oct. 1992, (5 pages).

Seleznev et al., Applications of Dielectric Dispersion Logging to Oil-Shale Reservoirs, SPWLA 52nd Annual Logging Symposium, May 14-18, 2011 (16 pages).

Wu, Z. et al., "Two- and Three-Dimensional van Krevelen Diagrams: A Graphical Analysis Complementary to the Kendrick Mass Plot for Sorting Elemental Compositions of Complex Organic Mixtures Based", Analytical Chemistry, vol. 76(9), pp. 2511-2516, May 1, 2004.

* cited by examiner

System 400

Tool 430

Plot 1410

Plot 1430

FORMATION CHARACTERIZATION SYSTEM

RELATED APPLICATIONS

This application claims priority to and the benefit of a US Provisional Application having Ser. No. 62/578,185, filed 27 Oct. 2017, which is incorporated by reference herein.

BACKGROUND

Rock can be formed of an aggregate of material. For example, rock may be formed of one or more of minerals, organic matter, volcanic glass, etc. Rock may include a single type of mineral or many types of minerals. Rocks may be characterized by types such as, for example, sedimentary rocks like sandstone and limestone (e.g., formed at the Earth's surface through deposition of sediments derived from weathered rocks, biogenic activity or precipitation from solution); igneous rocks (e.g., originating deeper within the Earth, where the temperature may be high enough to melt rocks, to form magma that can crystallize within the Earth or lava at the surface by volcanic activity); and metamorphic rocks (e.g., formed from other preexisting rocks during episodes of deformation of the Earth at temperatures and pressures high enough to alter minerals but inadequate to completely melt them). Changes to rock may occur by the activity of fluids in the Earth movement of igneous bodies or regional tectonic activity. Rocks may be recycled from one type to another by the constant changes in the Earth. As such, rocks may be considered to have associated "histories", which can add a temporal aspect to rocks found today.

SUMMARY

A method can include acquiring induction measurements in a borehole in a formation using an induction tool; determining dielectric properties of the formation using the induction measurements; and generating a log that characterizes particles in the formation based on the dielectric properties. A system can include a processor; memory accessibly by the processor; instructions stored in the memory and executable by the processor to instruct the system to: acquire induction measurements in a borehole in a formation using an induction tool; determine dielectric properties of the formation using the induction measurements; and generate a log that characterizes particles in the formation based on the dielectric properties. One or more computer-readable storage media can include processor-executable instructions where the processor-executable instructions include instructions to instruct a computer to: acquire induction measurements in a borehole in a formation using an induction tool; determine dielectric properties of the formation using the induction measurements; and generate a log that characterizes particles in the formation based on the dielectric properties. Various other apparatuses, systems, methods, etc., are also disclosed.

This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

Features and advantages of the described implementations can be more readily understood by reference to the following description taken in conjunction with the accompanying drawings.

DETAILED DESCRIPTION

This description is not to be taken in a limiting sense, but rather is made merely for the purpose of describing the general principles of the implementations. The scope of the described implementations should be ascertained with reference to the issued claims.

Figure 1:
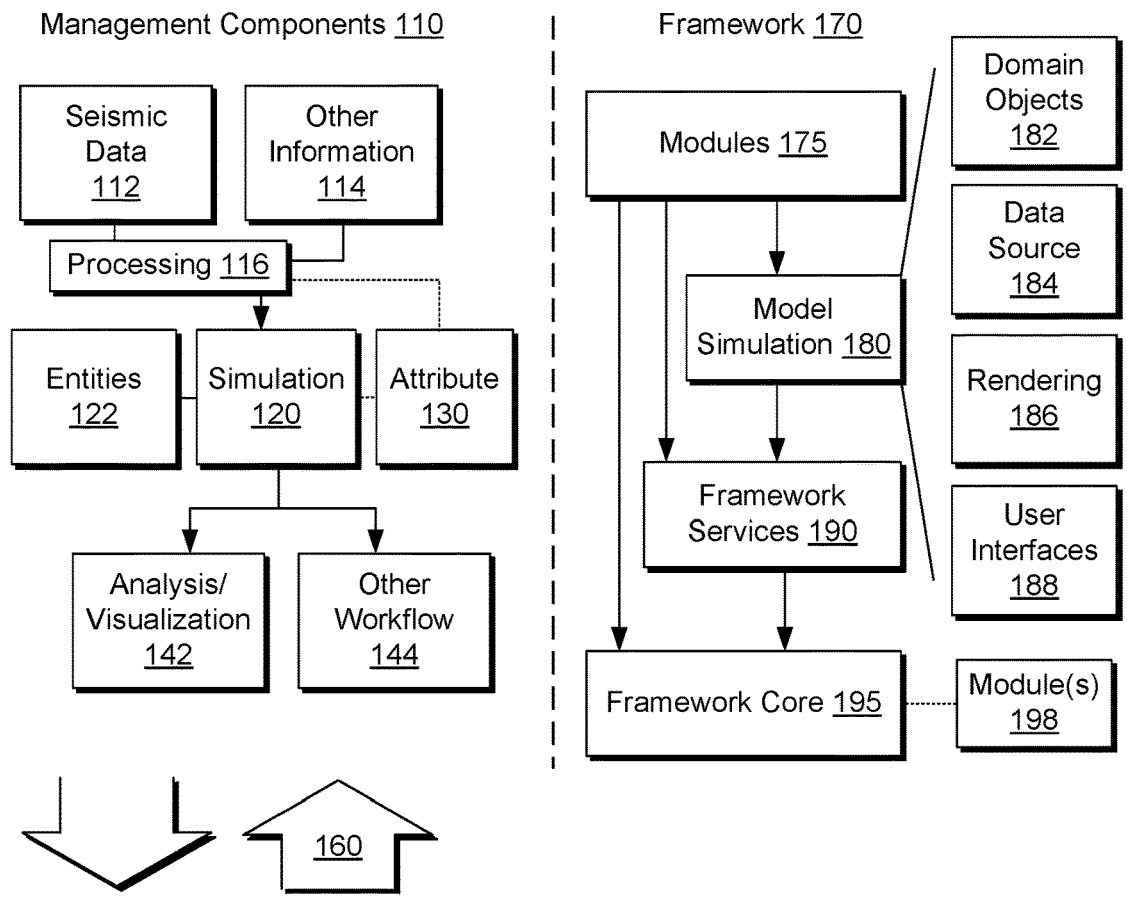
FIG. 1 illustrates an example system that includes various components for simulating a geological environment.
Figure 1:
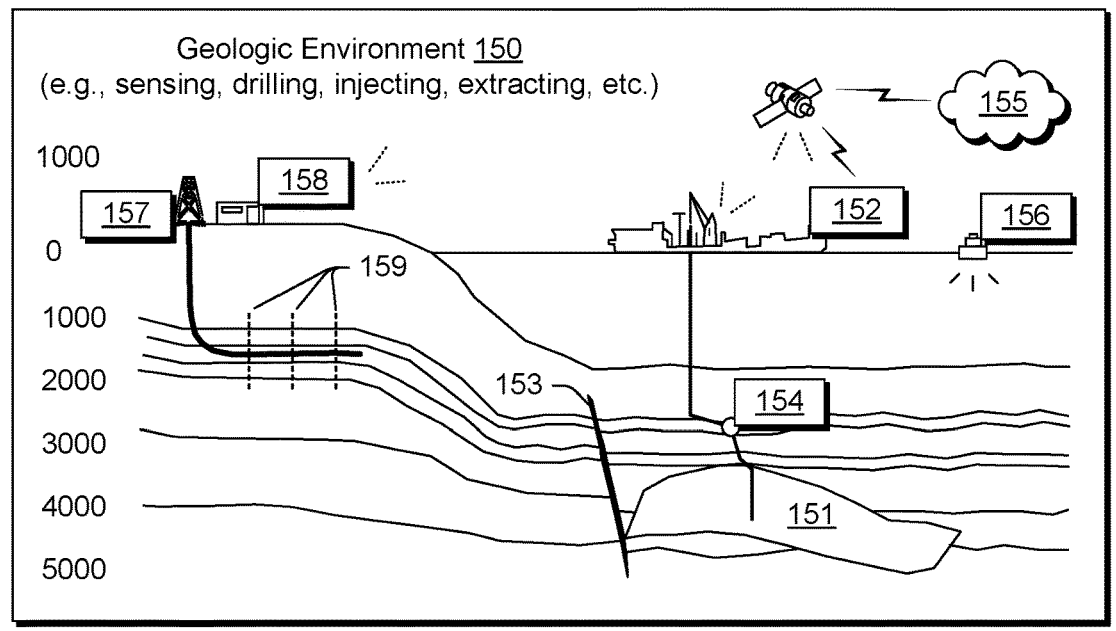

FIG. 1 shows an example of a system 100 that includes various management components 110 to manage various aspects of a geologic environment 150 (e.g., an environment that includes a sedimentary basin, a reservoir 151, one or more fractures 153, etc.). For example, the management components 110 may allow for direct or indirect management of sensing, drilling, injecting, extracting, etc., with respect to the geologic environment 150. In turn, further information about the geologic environment 150 may become available as feedback 160 (e.g., optionally as input to one or more of the management components 110).

In the example of FIG. 1, the management components 110 include a seismic data component 112, an additional information component 114 (e.g., well/logging data), a processing component 116, a simulation component 120, an attribute component 130, an analysis/visualization component 142 and a workflow component 144. In operation, seismic data and other information provided per the components 112 and 114 may be input to the simulation component 120.

In an example embodiment, the simulation component 120 may rely on entities 122. Entities 122 may include earth entities or geological objects such as wells, surfaces, reservoirs, etc. In the system 100, the entities 122 can include virtual representations of actual physical entities that are reconstructed for purposes of simulation. The entities 122 may include entities based on data acquired via sensing, observation, etc. (e.g., the seismic data 112 and other information 114). An entity may be characterized by one or more properties (e.g., a geometrical pillar grid entity of an earth model may be characterized by a porosity property). Such properties may represent one or more measurements (e.g., acquired data), calculations, etc.

In an example embodiment, the simulation component 120 may operate in conjunction with a software framework such as an object-based framework. In such a framework, entities may include entities based on pre-defined classes to facilitate modeling and simulation. An example of an object-based framework is the MICROSOFT™ .NET™ framework (Redmond, Wash.), which provides a set of extensible object classes. In the .NET™ framework, an object class encapsulates a module of reusable code and associated data structures. Object classes can be used to instantiate object instances for use by a program, script, etc. For example, borehole classes may define objects for representing boreholes based on well data. A model of a basin, a reservoir, etc. may include one or more boreholes where a borehole may be, for example, for measurements, injection, production, etc. As an example, a borehole may be a wellbore of a well, which may be a completed well (e.g., for production of a resource from a reservoir, for injection of material, etc.).

In the example of FIG. 1, the simulation component 120 may process information to conform to one or more attributes specified by the attribute component 130, which may include a library of attributes. Such processing may occur prior to input to the simulation component 120 (e.g., consider the processing component 116). As an example, the simulation component 120 may perform operations on input information based on one or more attributes specified by the attribute component 130. In an example embodiment, the simulation component 120 may construct one or more models of the geologic environment 150, which may be relied on to simulate behavior of the geologic environment 150 (e.g., responsive to one or more acts, whether natural or artificial). In the example of FIG. 1, the analysis/visualization component 142 may allow for interaction with a model or model-based results (e.g., simulation results, etc.). As an example, output from the simulation component 120 may be input to one or more other workflows, as indicated by a workflow component 144.

As an example, the simulation component 120 may include one or more features of a simulator such as the ECLIPSE® reservoir simulator (Schlumberger Limited, Houston, Tex.), the INTERSECT® reservoir simulator (Schlumberger Limited, Houston, Tex.), the VISAGE® geomechanics simulator (Schlumberger Limited, Houston, Tex.), the PETROMOD® petroleum systems simulator (Schlumberger Limited, Houston, Tex.), the PIPESIM® network simulator (Schlumberger Limited, Houston, Tex.), TECHLOG® petrophysical framework (Schlumberger Limited, Houston, Tex.), etc. The ECLIPSE® simulator includes numerical solvers that may provide simulation results such as, for example, results that may predict dynamic behavior for one or more types of reservoirs, that may assist with one or more development schemes, which may assist with one or more production schemes, etc. The VISAGE® simulator includes finite element numerical solvers that may provide simulation results such as, for example, results as to compaction and subsidence of a geologic environment, well and completion integrity in a geologic environment, cap-rock and fault-seal integrity in a geologic environment, fracture behavior in a geologic environment, thermal recovery in a geologic environment, $CO_2$ disposal, etc. The PETROMOD® simulator includes finite element numerical solvers that may provide simulations results such as, for example, results as to structural evolution, temperature, and pressure history and as to effects of such factors on generation, migration, accumulation, and loss of oil and gas in a petroleum system through geologic time. Such a simulator can provide properties such as, for example, gas/oil ratios (GOR) and API gravities, which may be analyzed, understood, and predicted as to a geologic environment. The PIPESIM™ simulator includes solvers that may provide simulation results such as, for example, multiphase flow results (e.g., from a reservoir to a wellhead and beyond, etc.), flowline and surface facility performance, etc. The PIPESIM® simulator may be integrated, for example, with the AVOCET® production operations framework (Schlumberger Limited, Houston Tex.). As an example, a reservoir or reservoirs may be simulated with respect to one or more enhanced recovery techniques (e.g., consider a thermal process such as SAGD, etc.).

In an example embodiment, the management components 110 may include features of a framework such as the PETREL® seismic to simulation software framework (Schlumberger Limited, Houston, Tex.). The PETREL® framework provides components that allow for optimization of exploration and development operations. The PETREL® framework includes seismic to simulation software components that can output information for use in increasing reservoir performance, for example, by improving asset team productivity. Through use of such a framework, various professionals (e.g., geophysicists, geologists, and reservoir engineers) can develop collaborative workflows and integrate operations to streamline processes (e.g., with respect to one or more geologic environments, etc.). Such a framework may be considered an application (e.g., executable using one or more devices) and may be considered a data-driven application (e.g., where data is input for purposes of modeling, simulating, etc.).

In an example embodiment, various aspects of the management components 110 may include add-ons or plug-ins that operate according to specifications of a framework environment. For example, a framework environment marketed as the OCEAN® framework environment (Schlumberger Limited, Houston, Tex.) allows for integration of add-ons (or plug-ins) into a PETREL® framework workflow. The OCEAN® framework environment leverages .NET™ tools (Microsoft Corporation, Redmond, Wash.) and offers stable, user-friendly interfaces for efficient development. In an example embodiment, various components may be implemented as add-ons (or plug-ins) that conform to and operate according to specifications of a framework environment (e.g., according to application programming interface (API) specifications, etc.).

FIG. 1 also shows an example of a framework 170 that includes a model simulation layer 180 along with a framework services layer 190, a framework core layer 195 and a modules layer 175. The framework 170 may include the OCEAN® framework where the model simulation layer 180 is the PETREL® model-centric software package that hosts OCEAN® framework applications. In an example embodiment, the PETREL® software may be considered a data-driven application. The PETREL® software can include a framework for model building and visualization. Such a model may include one or more grids.

The model simulation layer 180 may provide domain objects 182, act as a data source 184, provide for rendering 186 and provide for various user interfaces 188. Rendering 186 may provide a graphical environment in which applications can display their data while the user interfaces 188 may provide a common look and feel for application user interface components.

In the example of FIG. 1, the domain objects 182 can include entity objects, property objects and optionally other objects. Entity objects may be used to geometrically represent wells, logs, core data, surfaces, reservoirs, etc., while property objects may be used to provide property values as well as data versions and display parameters. For example, an entity object may represent a well where a property object provides log information as well as version information and display information (e.g., to display the well as part of a model).

In the example of FIG. 1, data may be stored in one or more data sources (or data stores, generally physical data storage devices), which may be at the same or different physical sites and accessible via one or more networks. The model simulation layer 180 may be configured to model projects. As such, a particular project may be stored where stored project information may include inputs, models, results and cases. Thus, upon completion of a modeling session, a user may store a project. At a later time, the project can be accessed and restored using the model simulation layer 180, which can recreate instances of the relevant domain objects.

In the example of FIG. 1, the geologic environment 150 may include layers (e.g., stratification) that include a reservoir 151 and that may be intersected by a fault 153. As an example, the geologic environment 150 may be outfitted with any of a variety of sensors, detectors, actuators, etc. For example, equipment 152 may include communication circuitry to receive and to transmit information with respect to one or more networks 155. Such information may include information associated with downhole equipment 154, which may be equipment to acquire information, to assist with resource recovery, etc. Other equipment 156 may be located remote from a well site and include sensing, detecting, emitting or other circuitry. Such equipment may include storage and communication circuitry to store and to communicate data, instructions, etc. As an example, one or more satellites may be provided for purposes of communications, data acquisition, etc. For example, FIG. 1 shows a satellite in communication with the network 155 that may be configured for communications, noting that the satellite may additionally or alternatively include circuitry for imagery (e.g., spatial, spectral, temporal, radiometric, etc.).

FIG. 1 also shows the geologic environment 150 as optionally including equipment 157 and 158 associated with a well that includes a substantially horizontal portion that may intersect with one or more fractures 159. For example, consider a well in a shale formation that may include natural fractures, artificial fractures (e.g., hydraulic fractures) or a combination of natural and artificial fractures. As an example, a well may be drilled for a reservoir that is laterally extensive. In such an example, lateral variations in properties, stresses, etc. may exist where an assessment of such variations may assist with planning, operations, etc. to develop a laterally extensive reservoir (e.g., via fracturing, injecting, extracting, etc.). As an example, the equipment 157 and/or 158 may include components, a system, systems, etc. for fracturing, seismic sensing, analysis of seismic data, assessment of one or more fractures, etc.

As an example, the geologic environment 150 and/or another geologic environment can include various types of features. For example, a geologic environment can include one or more salt domes, magma intrusions, volcanic regions, geothermal regions, waste storage regions, etc. As an example, a framework may provide for modeling geothermal phenomena, mechanical phenomena, waste storage phenomena (e.g., radioactive or other waste), etc. As an example, a geologic environment can include rock that may be oriented horizontally, vertically, or at other types of orientations. As an example, a framework may provide for modeling a geologic environment with respect to structures, which may be completions or other types of structures.

As an example, in geothermal exploration, cylindrical magmatic plugs may be identified and characterized. A volcanic plug can be an igneous intrusion formed when magma crystallizes within a neck of a volcano. In such an example, subsequent weathering and erosion can remove some of the rock to leave cylindrical plugs that formed from magma that has cooled inside volcanic vents. As an example, consider Devil's Tower (Wyoming), which is a volcanic plug, formed of phonolite some 40 million years ago. Devil's Tower originated as a volcanic vent, but subsequent erosion of the surrounding rock has revealed the igneous rock that cooled and solidified underground. The phonolite that forms the Devil's Tower originates from continental crust and it includes crystals of aegirine and less silica than various other rhyolite magmas. As another example, consider Shiprock (New Mexico), which is a lampropohyre plug formed some 30 million years ago where lavas and pyroclastic deposits of the volcano have since disappeared and subsequent erosion of the underlying soft shales has steadily lowered the surface of the surrounding plains.

As an example, a geologic environment can include dikes and sills. As an example, a method can include identifying such features, for example, based at least in part on information acquired via one or more types of borehole tool sensors. As an example, a method can include identifying thinly bedded features that can disrupt the bedding such as veins, fractures, faults, dikes, sills, etc.

As mentioned, the system 100 may be used to perform one or more workflows. A workflow may be a process that includes a number of worksteps. A workstep may operate on data, for example, to create new data, to update existing data, etc. As an example, a may operate on one or more inputs and create one or more results, for example, based on one or more algorithms. As an example, a system may include a workflow editor for creation, editing, executing, etc. of a workflow. In such an example, the workflow editor may provide for selection of one or more pre-defined worksteps, one or more customized worksteps, etc. As an example, a workflow may be a workflow implementable in the TECHLOG® framework or PETREL® framework, for example, that operates on well log data, seismic data, seismic attribute(s), etc. As an example, a workflow may be a process implementable in the OCEAN® framework. As an example, a workflow may include one or more worksteps that access a module such as a plug-in (e.g., external executable code, etc.).

FIG. 1 also shows one or more modules 198, which may operate in conjunction with the framework 170. For example, the one or more modules 198 may be implemented as one or more plug-in module, one or more external modules, etc. As an example, the one or more modules 198 may include one or more modules of the TECHLOG® framework (Schlumberger Limited, Houston, Tex.), which can provide wellbore-centric, cross-domain workflows based on a data management layer. The TECHLOG® framework includes features for petrophysics (core and log), geology, drilling, reservoir and production engineering, and geophysics.

Figure 2:
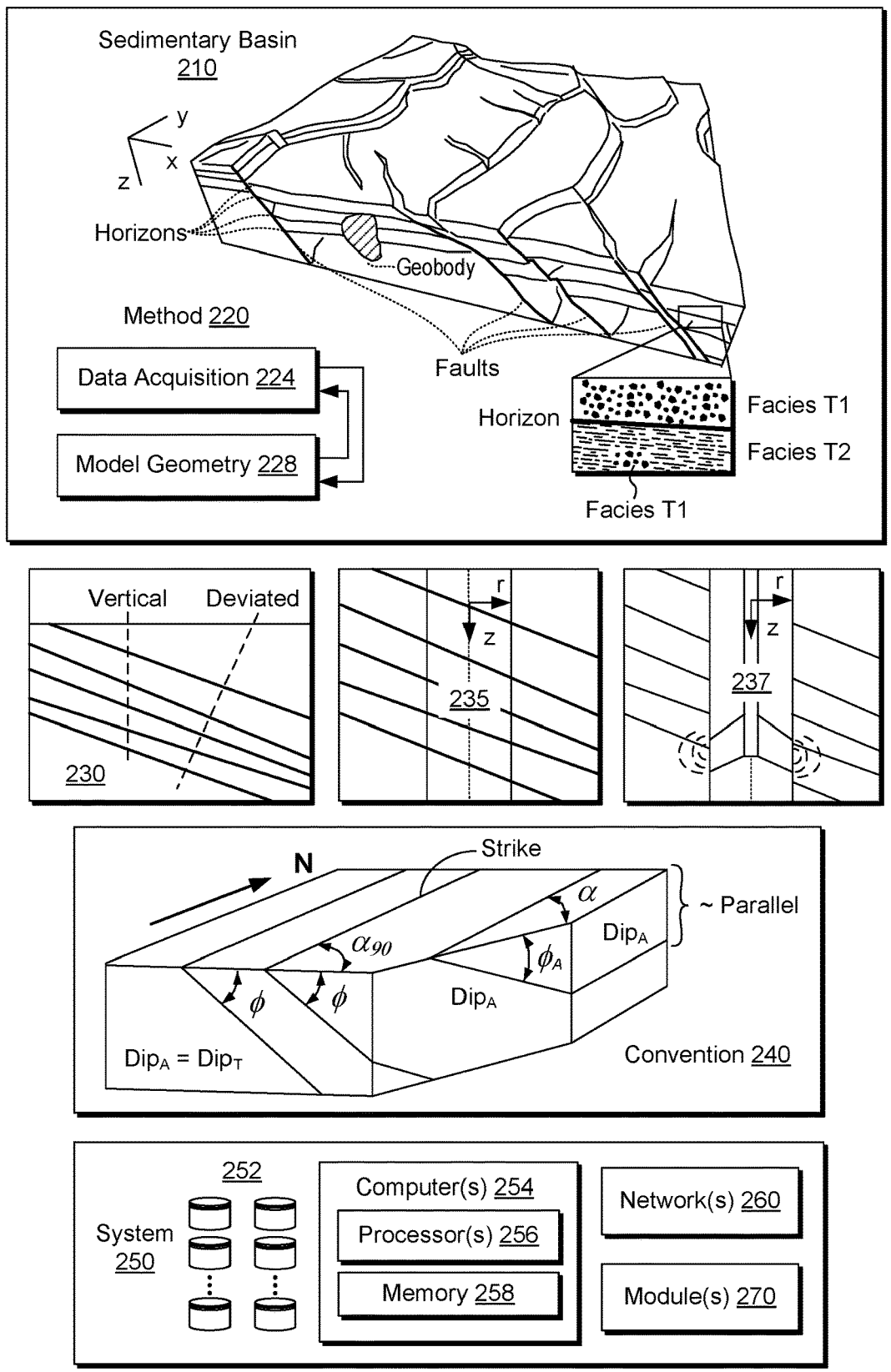
FIG. 2 illustrates examples of a basin, a convention and a system.

FIG. 2 shows an example of a sedimentary basin 210 (e.g., a geologic environment), an example of a method 220 for model building (e.g., for a simulator, etc.), an example of a formation 230, an example of a borehole 235 in a formation, an example of a convention 240 and an example of a system 250.

As an example, data acquisition, reservoir simulation, petroleum systems modeling, etc. may be applied to characterize various types of subsurface environments, including environments such as those of FIG. 1.

In FIG. 2, the sedimentary basin 210, which is a geologic environment, includes horizons, faults, one or more geobodies and facies formed over some period of geologic time. These features are distributed in two or three dimensions in space, for example, with respect to a Cartesian coordinate system (e.g., x, y and z) or other coordinate system (e.g., cylindrical, spherical, etc.). As shown, the model building method 220 includes a data acquisition block 224 and a model geometry block 228. Some data may be involved in building an initial model and, thereafter, the model may optionally be updated in response to model output, changes in time, physical phenomena, additional data, etc. As an example, data for modeling may include one or more of the following: depth or thickness maps and fault geometries and timing from seismic, remote-sensing, electromagnetic, gravity, outcrop and well log data. Furthermore, data may include depth and thickness maps stemming from facies variations (e.g., due to seismic unconformities) assumed to following geological events ("iso" times) and data may include lateral facies variations (e.g., due to lateral variation in sedimentation characteristics).

To proceed to modeling of geological processes, data may be provided, for example, data such as geochemical data (e.g., temperature, kerogen type, organic richness, etc.), timing data (e.g., from paleontology, radiometric dating, magnetic reversals, rock and fluid properties, etc.) and boundary condition data (e.g., heat-flow history, surface temperature, paleowater depth, etc.).

In basin and petroleum systems modeling, quantities such as temperature, pressure and porosity distributions within the sediments may be modeled, for example, by solving partial differential equations (PDEs) using one or more numerical techniques. Modeling may also model geometry with respect to time, for example, to account for changes stemming from geological events (e.g., deposition of material, erosion of material, shifting of material, etc.).

The aforementioned modeling framework marketed as the PETROMOD® framework (Schlumberger Limited, Houston, Tex.) includes features for input of various types of information (e.g., seismic, well, geological, etc.) to model evolution of a sedimentary basin. The PETROMOD® framework provides for petroleum systems modeling via input of various data such as seismic data, well data and other geological data, for example, to model evolution of a sedimentary basin. The PETROMOD® framework may predict if, and how, a reservoir has been charged with hydrocarbons, including, for example, the source and timing of hydrocarbon generation, migration routes, quantities, pore pressure and hydrocarbon type in the subsurface or at surface conditions. In combination with a framework such as the PETREL® framework, workflows may be constructed to provide basin-to-prospect scale exploration solutions. Data exchange between frameworks can facilitate construction of models, analysis of data (e.g., PETROMOD® framework data analyzed using PETREL® framework capabilities), and coupling of workflows. As an example, the TECHLOG® framework may be implemented in a workflow, for example, using one or more features for petrophysics (core and log), geology, drilling, reservoir and production engineering, and geophysics.

As shown in FIG. 2, the formation 230 includes a horizontal surface and various subsurface layers. As an example, a borehole may be vertical. As another example, a borehole may be deviated. In the example of FIG. 2, the borehole 235 may be considered a vertical borehole, for example, where the z-axis extends downwardly normal to the horizontal surface of the formation 230. As an example, a tool 237 may be positioned in a borehole, for example, to acquire information. As mentioned, a borehole tool may be configured to acquire electrical borehole images. As an example, the fullbore Formation MicroImager (FMI) tool (Schlumberger Limited, Houston, Tex.) can acquire borehole image data. A data acquisition sequence for such a tool can include running the tool into a borehole with acquisition pads closed, opening and pressing the pads against a wall of the borehole, delivering electrical current into the material defining the borehole while translating the tool in the borehole, and sensing current remotely, which is altered by interactions with the material.

Figure 3:
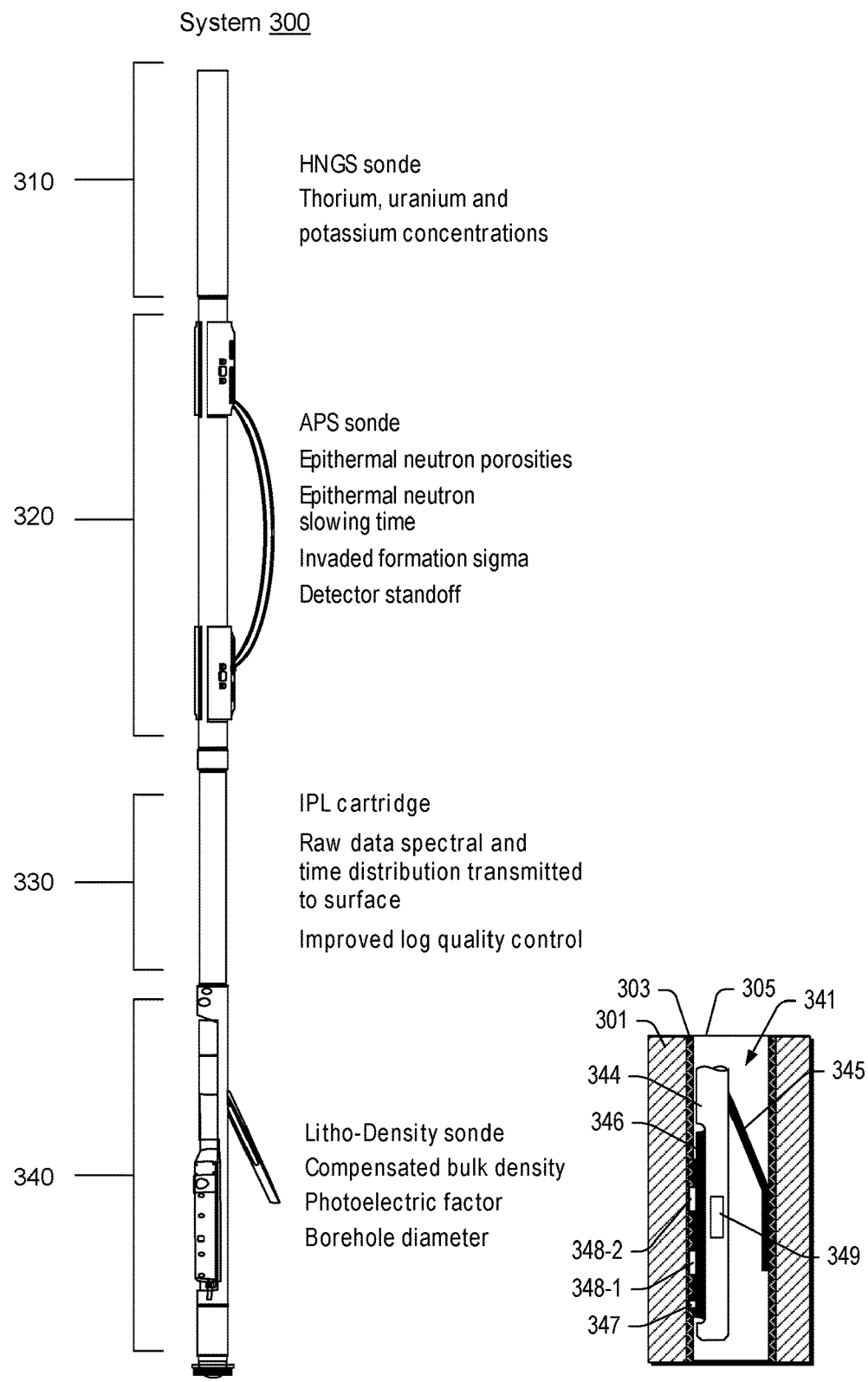
FIG. 3 illustrates an example of a system.

FIG. 3 shows an example of a system 300 that can include various assemblies. For example, the system 300 can include a hostile-environment natural gamma ray sonde (HNGS) assembly 310, an accelerator porosity sonde (APS) assembly 320, an integrated porosity lithology (IPL) cartridge assembly 330 and a litho-density sonde (LDS) assembly 340. As an example, the system 300 may be an integrated porosity lithology (IPL) system such as, for example, the IPL system marketed by Schlumberger Limited, Houston, Tex.

In the example of FIG. 3, the litho-density sonde (LDS) assembly 340 includes a pad with a gamma ray source and a plurality of detectors (e.g., two or more detectors). As an example, consider a Cesium-137 source, which emits gamma rays of about 0.66 MeV. As an example, detectors may be spaced, for example, axially along a LDS sonde. In the example of FIG. 3, the LDS assembly 340 can include magnetic shielding and electronic circuitry, for example, to record full pulse-height spectra from the detectors and process such information (e.g., into windows, etc.). In such an example, bulk density and photoelectric effect (PE) information may be derived. As an example, spectral information may be used to improve log and calibration quality control.

As an example, a tool such as an LDS assembly can include at least one detector and at least one source. As an example, a distance between a source and a detector may be of the order of inches. As an example, a tool that includes a source and detectors may have an axial length of about one meter or less as to a maximum axial length defined by locations of the source and the detectors.

As an example, a tool such as an LDS assembly can include circuitry where the circuitry includes at least one controller (e.g., microcontroller, processor, etc.). As an example, the LDS assembly may include memory that can store instructions executable by at least one controller (e.g., consider executable firmware, software, etc.). As an example, one or more filters may be included in an LDS assembly and/or in a unit operatively coupled to an LDS assembly. In such an example, the one or more filters may be applied to data acquired via one or more detectors. As an example, a detector may have an associated filter or filter set. For example, where an LDS assembly includes N detectors, N filters or N sets of filters may be provided (e.g., in hardware, software, hardware and software).

As an example, the LDS assembly 340 can include a specified range for bulk density measurements (e.g., about 2 $g/cm^3$ to about 3 $g/cm^3$ with an accuracy of about +/−0.01 $g/cm^3$) and a specified rang for photoelectric factor (PE factor) (e.g., about 1 to about 6, with an accuracy of about +/−10 percent).

FIG. 3 also shows an example of an LDS assembly 341 with respect to a formation 301 that may include mudcake 303 in a borehole 305. As shown in the example, the LDS assembly 341 can include a body or housing 344, a plough 346, an arm 345, a source 347, a plurality of detectors 348-1 and 348-2 (e.g., two or more detectors), and circuitry 349. As an example, the circuitry 349 may include one or more controllers, memory, etc. As an example, a controller may be a microcontroller (e.g., an ARM chip, etc.), a processor, an ASIC, etc. As an example, a controller may operate via instructions stored in memory (e.g., firmware instructions, software instructions, RISC instructions, etc.). As an example, circuitry may be included in a cartridge such as, for example, the cartridge 330 of the system 300 of FIG. 3. As an example, one or more of the assemblies 310, 320, 330 and 340 of the system 300 may include interfaces, for example, for communication of information. As an example, one or more of the assemblies 310, 320, 330 and 340 of the system 300 may include memory, for example, as a storage device that may store one or more of data and instructions. As an example, a method may be implemented in part via instructions that may be executable by circuitry (e.g., a controller, microcontroller, processor, etc.).

Figure 4:
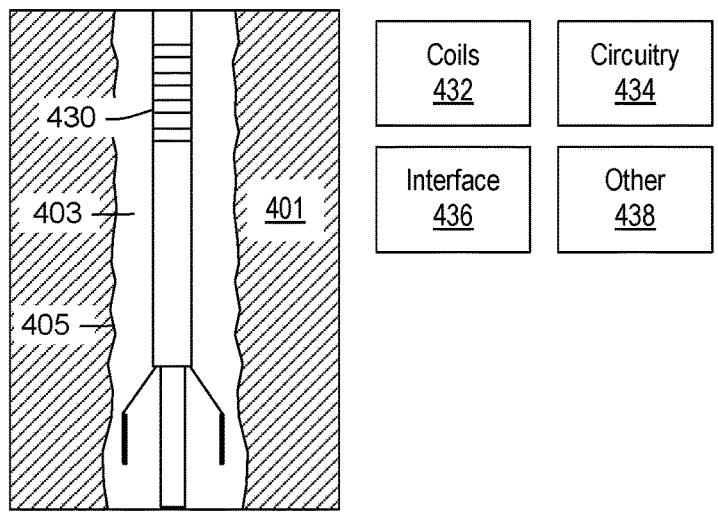
FIG. 4 illustrates an example of a system.
Figure 4:
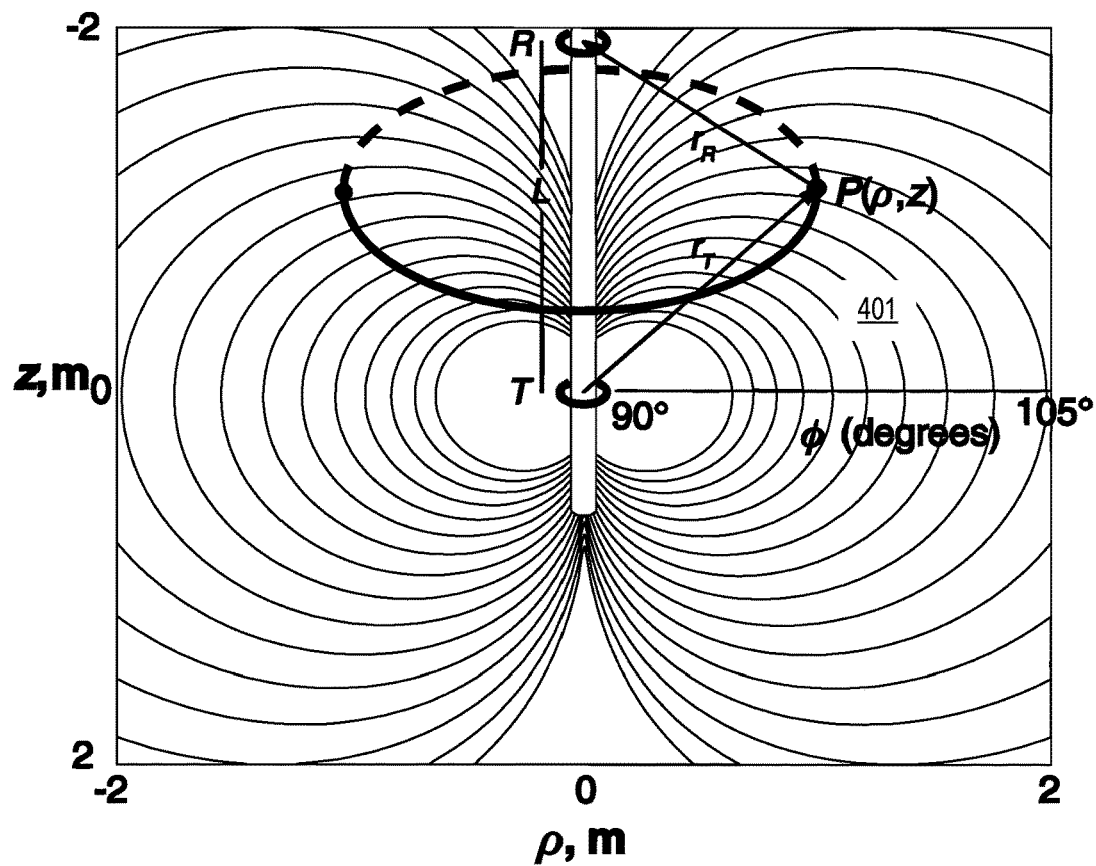

FIG. 4 shows an example of a system 400 with respect to a formation 401 with a borehole 403 defined in part by a borehole wall 405 where the system 400 includes a tool 430 that includes coils 432, circuitry 434 operatively coupled to the coils 432, one or more interfaces 436 (e.g., signal, power, etc.) and one or more other features 438. As an example, the tool 430 can be an induction tool and can include various features of an induction tool such as an array induction imager tool (e.g., AIT™ tool, Schlumberger Limited, Houston, Tex.) and/or a triaxial induction tool (e.g., RT SCANNER™ tool, Schlumberger Limited, Houston, Tex.).

As an example, an induction tool can include multiple coil arrays that aim to optimize vertical resolution and depth of investigation. As to operation of an induction tool, consider a graphical illustration of the tool 430 in FIG. 4, which shows two coils, labeled R and T, which represent a receiver coil and a transmission coil, respectively, which are operatively coupled to circuitry.

As shown, the coils can be mounted coaxially on a mandrel. As an example, a coil separation may be in a range from approximately 1 ft to approximately 10 ft. As an example, a coil can be defined by a number of turns, for example, a coil can have from approximately several turns to approximately 100 turns or more. As to operating frequency or frequencies, a tool may operate at relatively discrete frequencies in a range from approximately tens to hundreds of kilohertz (e.g., consider a tool with an operational frequency of approximately 20 kHz).

FIG. 4 shows the tool 430 with respect to the formation 401 where the two-coil induction array (R, T) can induce distributed currents in the formation via emissions of the transmitter coil. In the examples of FIG. 4, the borehole 403 can be assumed to be filled with fluid (e.g., liquid or gas) or fluids (e.g., liquid and gas), which may include solids. As an example, the borehole 403 can include drilling fluid (e.g., drilling mud).

In the example of FIG. 4, the induction transmitter coil (T) can be driven by an alternating current of circuitry (e.g., the circuitry 434 as operatively coupled to a power source) to create a primary time varying magnetic field around the transmitter coil. The primary time varying magnetic field can cause eddy currents to form, which may be in a relatively continuous circular distribution centered around an axis of the borehole. The induced eddy currents can be substantially proportional to conductivity of the formation and generate a secondary time varying magnetic field that can be detected via the receiver coil (R), for example, the secondary time varying magnetic field of the eddy currents can induce an alternating voltage in the receiver coil (R). As an example, the induced alternating voltage amplitude can be first-order proportional to the conductivity of the formation.

Because the transmitter coil (T) current is alternating, there can be a phase shift between the transmitter current and the current density in the formation. The phase shift can differ in the formation, for example, it can increase with distance into the formation, as represented by the number of degrees it, in FIG. 4. The phase in the receiver coil (R) can be even further shifted. At relatively low conductivities, the total phase shift is approximately 180 degrees and increases with increasing formation conductivity.

As an example, an induction tool may measure the part of the voltage that is 180 degrees phase-shifted from the transmitter current (e.g., so-called R-signal). As conductivity increases, and phase shifted, voltage can be a bit less than expected from a linear relationship. The difference can be attributed to a skin effect and/or dielectric permittivity. The dielectric permittivity $\varepsilon = \varepsilon_r \varepsilon_0$ includes the relative permittivity $\varepsilon_r$ without units and the absolute dielectric permittivity of a vacuum $\varepsilon_0$ ($\approx 8.8542 \times 10^{-12}$ As/Vm). As an example, an induction tool can make one or more additional measurements, for example, at a phase shift of approximately 270 degrees from the transmitter current (e.g., so-called X-signal). As an example, the R-signal and X-signal measurements can be in quadrature and allow for precise phase and amplitude measurement of the receiver voltage induced in the receiver coil (R).

To produce adequate sensitivity to an uninvaded zone, an induction tool may perforce include signals from a large volume of formation. A challenge can be to determine precisely where a measurement is coming from in a formation. As an example, a geometrical factor, as a 2D function $g(\rho,z)$, can define the part of the total signal that comes from an infinitesimally thin loop around a borehole. Such an approach tends to be valid at very low conductivities; noting that one or more modifications of the geometrical factor may be made for validity in low contrast formations at various conductivities (e.g., consider the Born response).

As an example, a response to formation layers can be given by a vertical response function $gV(z)$, which can be defined as the integral of the 2D response function $g(\rho,z)$ over radius $\rho$. As an example, a response to radial variations in a thick bed can be given by the radial response function $gR(\rho)$, which can be defined as the integral of $g(\rho,z)$ over z. The response of an array to invasion in a thick bed can be characterized by an integrated radial response GR, which can be the cumulative integral of $gR(\rho)$ over radius.

As direct transmitter-receiver mutual coupling of a two-coil array can produce a voltage several thousand times that from a formation, a two-coil array may be less practical than a tool with more coils. For example, consider a practical array that includes a three-coil array with a transmitter and two receivers. In such an example, the second receiver can be positioned axially between the transmitter and main receiver and may be wound oppositely so that the voltages in the two receivers tend to cancel when the array is in free space. In such an example, the response can be determined as a sum of the coil-pair responses.

As an example, an induction tool can include three transmitters and three receivers, with a symmetric Born response g. Such an array can be designed to achieve deep investigation, reasonable vertical resolution, and a low borehole effect. However, large peaks in the 2D response along the tool may result in sensitivity to borehole washouts, called cave effect.

As an example, an induction tool can be a dual-induction tool, which can measure or discriminate resistivity in multiple zones, which can include an invaded zone and a virgin zone. For example, consider a tool with an array as a deep-induction measurement array with a set of receivers that works with transmitters to produce a shallower measurement.

As to a multi-zone induction tool, measurements (e.g., such as ILm and ILd measurements) may not respond linearly to formation conductivity. Such nonlinearity can be closely related to changes in response shape and depth of investigation with increasing conductivity. The nonlinear response of an induction array can be referred to as a skin effect because it is related to the skin depth effect of AC current flowing in conductors, which can be frequency dependent. For example, as frequency increases, the skin depth can decrease; whereas, skin depth can increase as frequency decreases (e.g., long wavelengths).

As an example, a function can be applied to tool voltages to adjust for nonlinearity. For example, consider processing that effectuates a skin-effect function ("boost") applied to the measured R-signals from induction arrays. For example, consider computations based on response in an infinite homogeneous medium. As an example, ILd measurements can be processed using a three-station deconvolution filter to slightly sharpen bed-boundary transition(s) and to adjust for shoulder effect over a particular resistivity range (e.g., 1 to 10 ohm·m). As an example, at one or more other formation-resistivity ranges, the response may either produce horns or large shoulder effects.

As an example, an induction tool can be a phasor induction tool that can implement environmental adjustments. For example, consider use of a linear deconvolution function to adjust for shoulder effect and use of X-signal measurements to adjust for skin effect. As an example, an induction tool can implement phasor processing, for example, where it can be shown that a filter fitted at low conductivity works well at low conductivity but produces large errors at high conductivity. In such an example, the error is, however, a slowly varying function closely related to the X-signal. An algorithm applied to the X-signal to match it to the skin-effect error can allow a single FIR filter to adjust for shoulder effect over a relatively wide range of conductivities. As an example, one or more types of deconvolution filters may be utilized, which may provide for induction logs with a 2 ft (e.g., 0.6 m) vertical resolution (compared with 5 ft for ILm and 8 ft for ILd; 1.5 m for ILm and 2.4 m for ILd).

As an example, an induction tool can be a dual-induction tool that can measure both R and X signals and apply automatic shoulder-effect adjustments. As an example, a tool may provide a vertical resolution of approximately 2 ft (e.g., 0.6 m) and a median depth of investigation of approximately 90 in (e.g., 2.29 m).

As to an array induction tool, it may provide for results that are improved in some manners with respect to a phasor induction tool (e.g., dual-induction approach). An array induction tool may provide better estimates of Rt in the presence of deep-invasion or complex transition zones. As an example, a tool may include an oil-based mud imaging tool (e.g., OBM tool).

As an example, a tool can include several induction arrays with different depths of investigation. For example, consider the AIT™ tool as including eight three-coil arrays ranging in length from approximately 6 inches to approximately 6 ft (e.g., approximately 0.15 m to approximately 1.83 m).

As to array induction, a tool can process raw array signals for borehole effects. For example, consider a process based on a forward model of the arrays in a circular borehole, which may include a description of the tool in the model.

As an example, a signal measured by an induction tool eccenterred in a borehole can be described mathematically as a function of four parameters: the borehole radius r, the mud conductivity am, the formation conductivity of, and the tool position x with respect to the borehole wall (commonly referred to as the "standoff").

As an example, an adjustment algorithm can solve for some of these parameters by minimizing the difference between the modeled and actual logs from the four shortest arrays. The information content of these measurements is not sufficient to solve for the four borehole parameters at the same time. In practice, two of the four parameters can be reliably determined by this method. The other two parameters have to be either measured or fixed. The equivalent homogeneous formation conductivity of is to be solved for because no measurement is closely enough related to it. This leaves one of the other parameters to be determined, and the remaining two parameters to be entered as measurements. This leads to the three borehole adjustment methods to compute mud resistivity, hole diameter, and standoff. A tool can include mud resistivity sensors and circuitry to compute standoff, which may be utilized as a default borehole-adjustment method in water-based mud (WBM).

As an example, a method can combine array measurements to focus a resulting log to a desired depth of investigation, while at the same time doing so with a high vertical resolution and minimizing cave effect. Such a process can produce a log that is different from that produced by each of the individual arrays. It is still characterized by a response function, for example, a response function that is a weighted sum of the response functions of each of the individual channels. Skin effect in such an approach may be handled in a manner similar to a phasor tool.

As an example, an equation can associate a combination of logs from an eight array that distils radial information from the eight arrays into five independent logs with depths of investigation of 10, 20, 30, 60, and 90 in (0.254, 0.51, 0.76, 1.52, and 2.29 m). In such an example, each of these five logs may be available at a resolution of 1, 2, and 4 ft (e.g., 0.3, 0.6 and 1.2 m). In such an example, the radial profile tends to be the same at the resolutions, and the vertical resolution tends to be the same for the radial depths.

Interpretation of logs in deviated wells or where the apparent dip tends to be relatively high can be considerably complicated. Users of induction logs may take care in making quantitative analyses in wells that are deviated, or if the formation is dipping. If the shoulder-bed contrast is 20 or less, then the minimum angle where dip adjustment is demanded can be approximately 30 degrees. At shoulder-bed contrast of over 100, the logs adjustments can be demanded at dips as low as 10 degrees.

As an example, a tool can include circuitry that can measure one or more physical phenomena. As an example, consider circuitry that can measure induction. For example, consider a tool such as an array induction imager tool (e.g., AIT™ tool, Schlumberger Limited, Houston, Tex.) or a triaxial induction tool (e.g., RT SCANNER™ tool, Schlumberger Limited, Houston, Tex.), which can deliver array induction imager tool measurements. As an example, a tool can output values (e.g., values based on sensor measurements) for one or more resistivities. For example, consider vertical resistivity Rv and horizontal resistivity Rh. As an example, a tool can include a number of arrays such as, for example, consider a number of triaxial arrays where each array includes three collocated coils that can perform measurements of a formation. As an example, Rv and Rh can be calculated at each triaxial spacing. As an example, a tool can include a number of single-axis receivers that can help to characterize a borehole signal and process such a signal or signals for improved triaxial measurements. As an example, a tool can include circuitry for calculating formation dip and/or azimuth, for example, to assist with structural interpretation.

As an example, in a laminated formation, there can be resistivity anisotropy where, for example, resistivity measured perpendicular to laminated bedding (Rv) tends to be higher than resistivity measured parallel to the bedding (Rh). Such a scenario can occur when high resistivity sand layers are interspersed with low resistivity shale layers.

As mentioned, an induction tool can include components that can measure Rv and Rh. As an example, reservoir properties may be determined by using a sand-shale model that combines Rv and Rh logs with porosity and shale indicator logs. As an example, bulk properties may be calculated separately for the sand and shale components over a vertical interval. As an example, for a sand component, the properties can include sand resistivity, sand porosity and sand water saturation. As shales tend to be anisotropic, a model can provide for calculating vertical and horizontal shale resistivity, together with shale porosity and shale water saturation. As an example, a total water saturation may be calculated by averaging sand and shale water saturations by their relative abundance. Such an approach represents a departure from laminated sand evaluation techniques where there is no attempt to resolve each lamination. As an example, a method may aim to identify low resistivity pay zones.

Developments in induction tools can provide accurate measurements of in-phase and quadrature signals. A quadrature signal can be used to provide a skin-effect adjustment to the in-phase signal. Induction-tool processing and interpretation tends to neglect dielectric effects. In contrast, in various examples, such effects are not neglect; rather, dielectric effects are utilized in induction-tool processing. For example, consider one or more inversion algorithms that can be used to determine a dielectric permittivity and electric conductivity from the in-phase and quadrature signals simultaneously. As an example, consider one or more inversion algorithms of a US Patent Application having publication number 2009/0248308 A1, published 1 Oct. 2009, to Luling, is incorporated by reference herein, which is entitled "Simultaneous inversion of induction data for dielectric permittivity and electrical conductivity" ('308 application). The dielectric permittivity has been shown to be large on the order of 10,000 to 100,000,000 when certain clays and metallic particles are present in the formation of the right size, shape and percent volume. For example, consider a US Patent Application having publication number 2016/0139293 A1, published 19 May 2016, to Misra, which is entitled "Subsurface Estimation of Level of Organic Maturity" and incorporated by reference herein ('293 application); and, for example, consider a US Patent Application having publication number 2018/0113088 A1, published 26 Apr. 2018, to Misra, which is entitled "Method to estimate water saturation in electromagnetic measurements" and incorporated by reference herein ('088 application).

As to additional descriptions of materials in matrixes, consider Misra et al., Interfacial polarization of disseminated conductive minerals in absence of redox-active species: Part 1: Mechanistic model and validation, Geophysics, March 2016, Vol. 81, No. 2, pp. E139-E157 ("Misra Part 1"); Misra et al., Interfacial polarization of disseminated conductive minerals in absence of redox-active species: Part 2: Effective electrical conductivity and dielectric permittivity, Geophysics, March 2016, Vol. 81, No. 2, pp. E159-E176 ("Misra Part 2"); Misra et al., Dielectric Effects in Pyrite-Rich Clays on Multi-frequency Induction Logs and Equivalent Laboratory Core Measurements, SPWLA-2016-Z, SPWLA 57th Annual Logging Symposium, 25-29 June, Reykjavik, Iceland, 2016 ("Misra 2016"); and Misra et al., Laboratory Investigation of Petrophysical Applications of Multi-Frequency Inductive-Complex Conductivity Tensor Measurements, IDSPWLA-2015-Y, SPWLA 56th Annual Logging Symposium, 18-22 July, Long Beach, Calif., USA, 2015 ("Misra 2015"), each of which is incorporated by reference herein.

Figure 5:
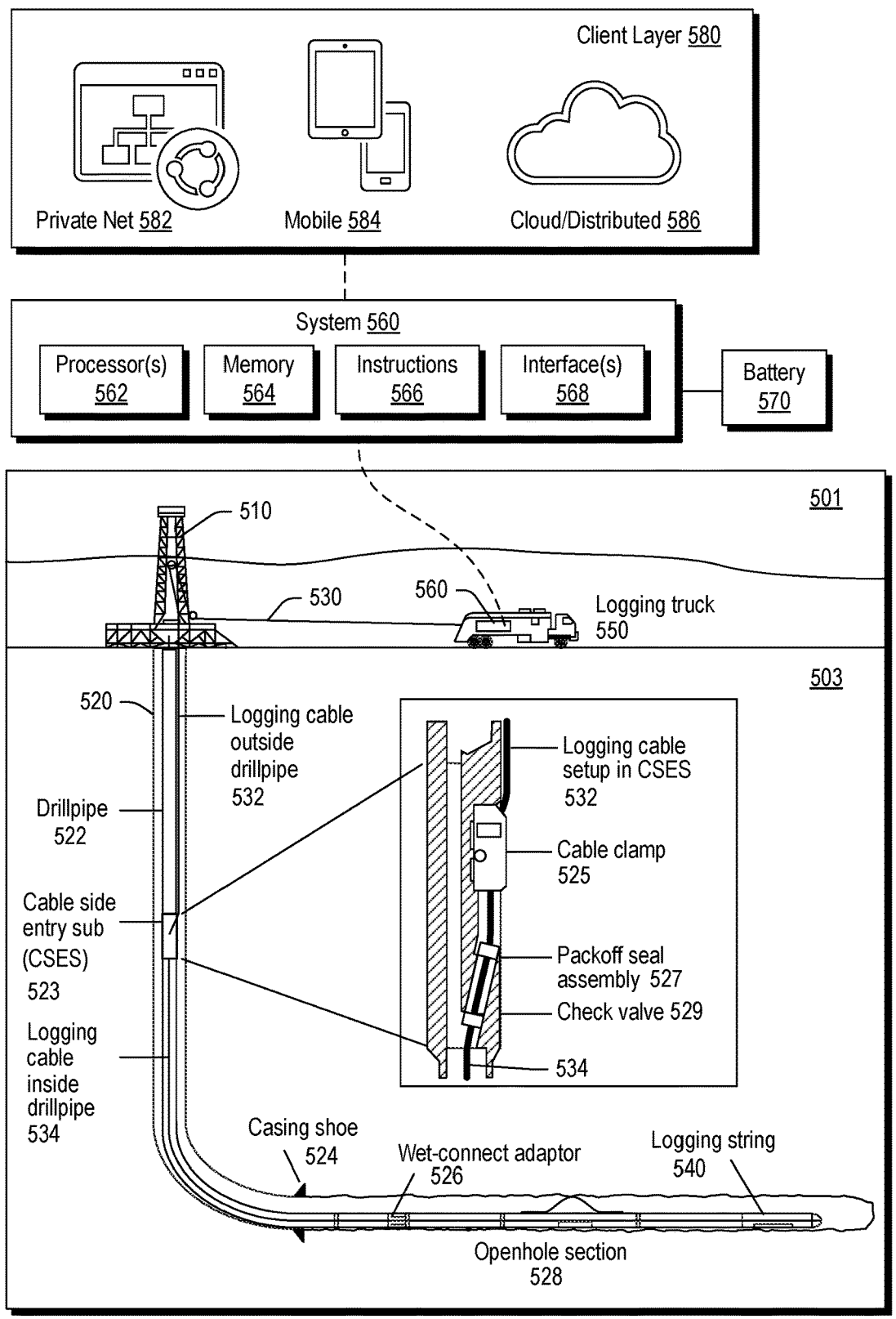
FIG. 5 illustrates an example of a system.

FIG. 5 shows an example of an environment 501 that includes a subterranean portion 503 where a rig 510 is positioned at a surface location above a bore 520. In the example of FIG. 5, various wirelines services equipment can be operated to perform one or more wirelines services including, for example, acquisition of data from one or more positions within the bore 520. As an example, one or more tools may be utilized for performing one or more wireline operations (e.g., services, etc.). A tool may be referred to as a logging tool, which may be part of a logging string that can be positioned, conveyed, etc., in a bore for acquiring data pertaining to an environment (e.g., a formation, a casing, cement, fluid(s), etc.). As an example, one or more features of the system 300, one or more features of the system 400, etc., may be utilized in conjunction with one or more of the pieces of equipment shown in FIG. 5.

In the example of FIG. 5, the bore 520 includes drillpipe 522, a casing shoe, a cable side entry sub (CSES) 523, a wet-connector adaptor 526 and an openhole section 528. As an example, the bore 520 can be a vertical bore or a deviated bore where one or more portions of the bore may be vertical and one or more portions of the bore may be deviated, including substantially horizontal.

In the example of FIG. 5, the CSES 523 includes a cable clamp 525, a packoff seal assembly 527 and a check valve 529. These components can provide for insertion of a logging cable 530 that includes a portion 532 that runs outside the drillpipe 522 to be inserted into the drillpipe 522 such that at least a portion 534 of the logging cable runs inside the drillpipe 522. In the example of FIG. 5, the logging cable 530 runs past the wet-connect adaptor 526 and into the openhole section 528 to a logging string 540.

As shown in the example of FIG. 5, a logging truck 550 (e.g., a wirelines services vehicle) can deploy the wireline 530 under control of a system 560. As shown in the example of FIG. 5, the system 560 can include one or more processors 562, memory 564 operatively coupled to at least one of the one or more processors 562, instructions 566 that can be, for example, stored in the memory 564, and one or more interfaces 568. As an example, the system 560 can include one or more processor-readable media that include processor-executable instructions executable by at least one of the one or more processors 562 to cause the system 560 to control one or more aspects of equipment of the logging string 540 and/or the logging truck 550. In such an example, the memory 564 can be or include the one or more processor-readable media where the processor-executable instructions can be or include instructions. As an example, a processor-readable medium can be a computer-readable storage medium that is not a signal and that is not a carrier wave.

FIG. 5 also shows a battery 570 that may be operatively coupled to the system 560, for example, to power the system 560. As an example, the battery 570 may be a back-up battery that operates when another power supply is unavailable for powering the system 560 (e.g., via a generator of the wirelines truck 550, a separate generator, a power line, etc.). As an example, the battery 570 may be operatively coupled to a network, which may be a cloud network. As an example, the battery 570 can include smart battery circuitry and may be operatively coupled to one or more pieces of equipment via a SMBus or other type of bus.

As an example, the system 560 can be operatively coupled to a client layer 580. In the example of FIG. 5, the client layer 580 can include features that allow for access and interactions via one or more private networks 582, one or more mobile platforms and/or mobile networks 584 and via the "cloud" 586, which may be considered to include distributed equipment that forms a network such as a network of networks. As an example, the system 560 can include circuitry to establish a plurality of connections (e.g., sessions). As an example, connections may be via one or more types of networks. As an example, connections may be client-server types of connections where the system 560 operates as a server in a client-server architecture. For example, clients may log-in to the system 560 where multiple clients may be handled, optionally simultaneously.

Figure 6:
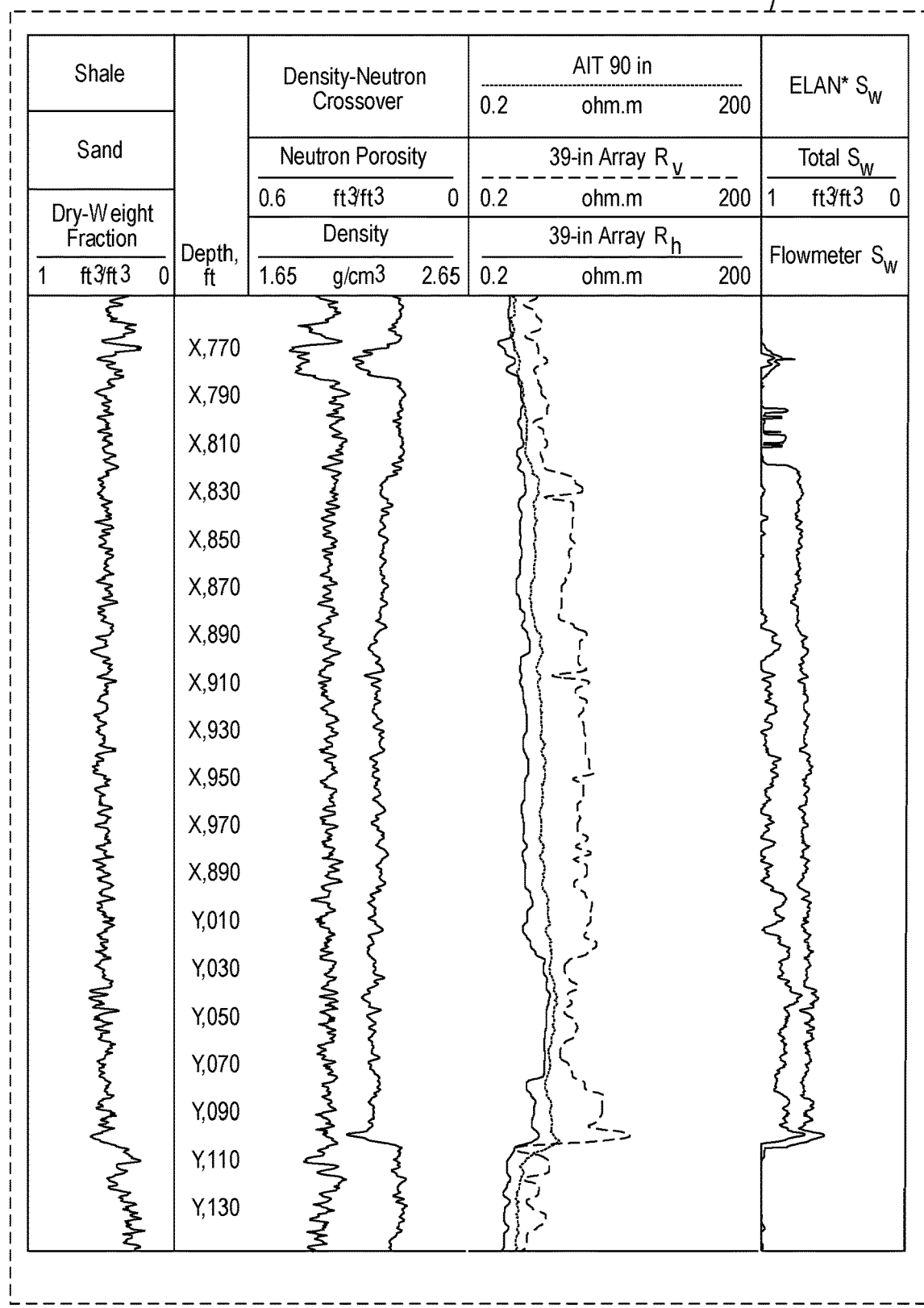
FIG. 6 illustrates an example of a graphical user interface.

FIG. 6 shows an example of a graphical user interface (GUI) 600 that includes a series of logs rendered to a display 601 (e.g., a display operatively coupled to a system such as the system 560 of FIG. 5). The GUI 600 includes logs for shale and sand as dry-weight fraction (e.g., from 1 to 0), neutron, AIT, Rv, Rh and flow related information. As to the AIT, it is given for an investigation depth of 90 inches (e.g., 2.29 m) and the Rv and Rh are given for a 39 inch (e.g., 0.99 m) array. As can be seen, the values for Rv tend to exceed those for Rh. As mentioned, resistivity measured perpendicular to laminated bedding (Rv) tend to be higher than resistivity measured parallel to the bedding (Rh). As mentioned, such a scenario can occur when high resistivity sand layers are interspersed with low resistivity shale layers.

Figure 7:
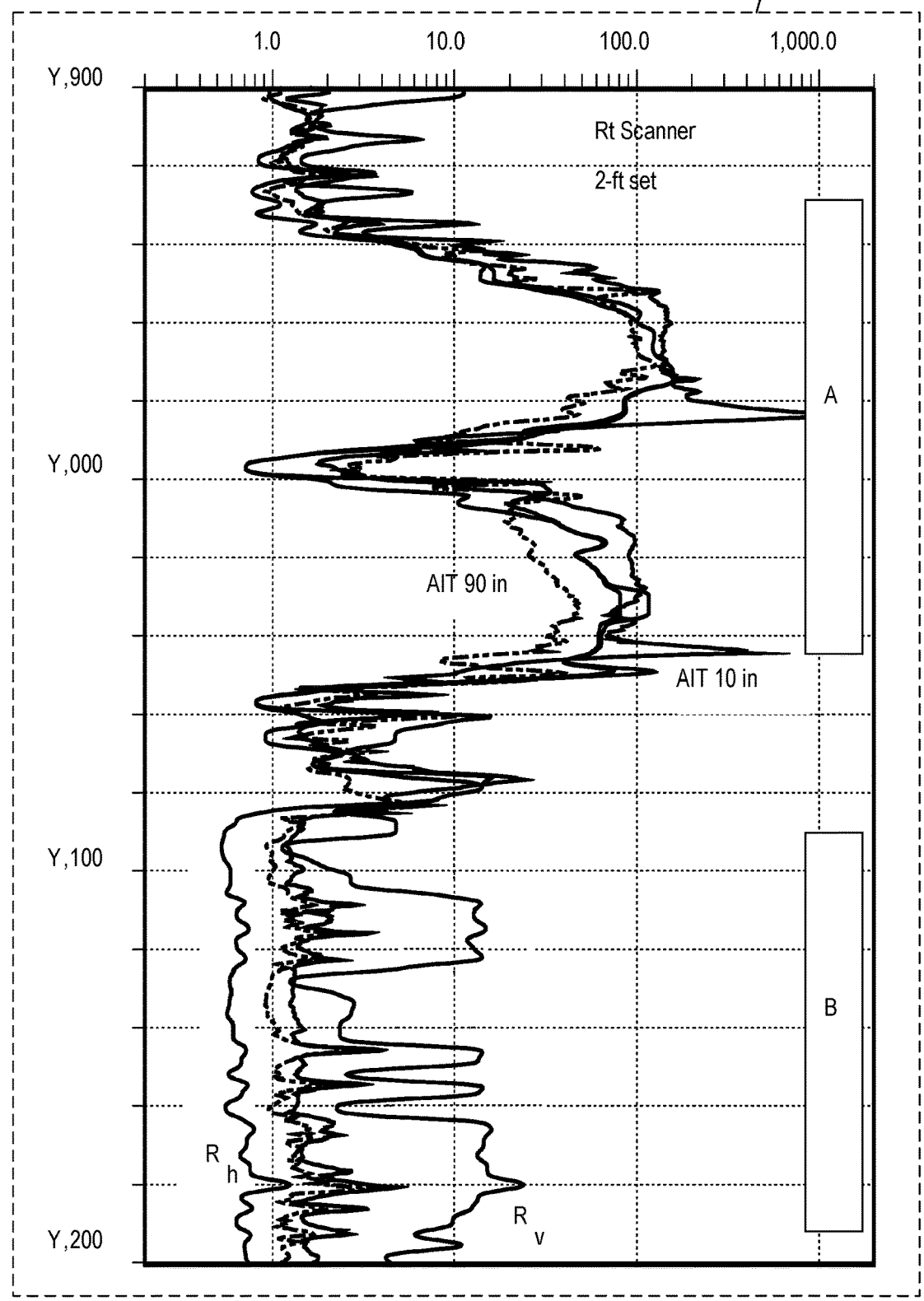
FIG. 7 illustrates an example of a graphical user interface.

FIG. 7 shows an example of a graphical user interface (GUI) 700 that includes a series of logs rendered to a display 701 (e.g., a display operatively coupled to a system such as the system 560 of FIG. 5). The GUI 700 shows data acquired from a RTSCANNER™ tool, with a 2 ft (e.g., 0.61 m) set. The data in the GUI 600 include AIT 90 in (e.g., 229 cm), AIT 10 in (e.g., 25 cm), Rv and Rh. As shown, the GUI 600 can be defined by two zones, labeled A and B. In the zone B, the values of Rv tend to be substantially greater than the values of Rh.

In the zone A, the AIT 90 in. (e.g., 229 cm) resistivity tends to read low in the thicker channel sands because of the surrounding dipping shale beds and the AIT 10 in. (e.g., 25 cm) resistivity also exhibits substantial shoulder-bed horns. The Rv and Rh measurements adjust for dipping shale beds in the zone A and, in the zone B, the measurements properly provide for identification of a low resistivity pay zone that otherwise may have been overlooked.

The aforementioned RTSCANNER™ tool can have a length of approximately 6 m, a weight of approximately 180 kg, an outside diameter of approximately 10 cm, a maximum logging speed of approximately 1000 m/h, a maximum operating temperature of approximately 150 degrees C., and a maximum operating pressure of approximately 140,000 kPa (e.g., or more such as a 207,000 kPa rated tool). As an example, such a tool can include components for outputting Rv, Rh, AIT logs, spontaneous potential, dip and azimuth. A tool may include components for 3D measurements. As an example, one or more values may be computed using measurements such as Rv and/or Rh measurements. For example, consider hydrocarbon and/or water values, which may help to characterize a formation (e.g., a reservoir).

As mentioned, an induction tool can be utilized to characterize a formation, which may be a laminated formation. As an example, a formation can include organic-rich mudrock. Mudrocks can be defined as a class of relatively fine grained siliciclastic sedimentary rocks. The varying types of mudrocks can include: siltstone, claystone, mudstone, slate, and shale. Most particles in such rock tend to be less than 0.0625 mm (e.g., 1/16 mm or 0.0025 inches) and conventionally too small to study readily in the field. Visually, the various different rock types tend to look quite similar; however, substantial differences in composition and nomenclature exist.

Mudrocks make up approximately fifty percent of the sedimentary rocks in the geologic record, and the most widespread deposits on Earth. Fine sediment is the most abundant product of erosion, and these sediments contribute to the overall omnipresence of mudrocks. With increased pressure over time platey clay minerals may become aligned, with the appearance of parallel layering (fissility). Such finely bedded material that splits readily into thin layers can be referred to as shale, as can be distinct from mudstone. The lack of fissility or layering in mudstone may be due either to the original texture or to the disruption of layering by burrowing organisms in the sediment prior to lithification.

Mudrocks, particularly black shale, are sources and containers of petroleum sources throughout the world. Since mudrocks and organic material demand quiet water conditions for deposition, mudrocks are the most likely resource for petroleum. Mudrocks have low porosity, they are considerably impermeable, and often, if the mudrock is not black shale, it remains useful as a seal to petroleum and natural gas reservoirs. In the case of petroleum found in a reservoir, the rock surrounding the petroleum is not the source rock, whereas black shale is an example of a generally organic-rich rock that includes hydrocarbons, a source rock.

A formation can include vitrinite, which is a component of coals and most sedimentary kerogens. Vitrinite is a type of maceral, where "macerals" are organic components of coals or other substances analogous to "minerals" of rocks. Vitrinite tends to have a shiny appearance resembling glass (vitreous). Vitrinite is derived from cell-wall material or woody tissue of plants from which coals or other substances were formed. Chemically, vitrinite is composed of polymers, cellulose and lignin.

Kerogen is a complex heterogeneous carbonaceous material, and it is the precursor of oil and gas found in the subsurface formations. It is a polymeric material formed by biogeochemical alteration of detrital and dissolved organic matter deposited together with inorganic sediment, and a primary source of oil and gas accumulations throughout the world. Kerogen is a component of shale rocks and plays a key role in the storage and recovery of hydrocarbons from shale rocks. Techniques for recovery of hydrocarbons from shales tend to leave a substantial percentage (e.g., at times, over 80 percent) of hydrocarbons in the subsurface.

Kerogen is a fraction of organic matter in buried sediments that tends to be insoluble in common solvents.

Although kerogen does not dissolve in organic solvents, like insoluble synthetic polymers such as elastomers and other porous materials, it sorbs and is swollen by them. Kerogen may be classified into four types based on the depositional environment, the biological source of the organic matter from which it was derived and its elemental composition, particularly the hydrogen to carbon (H/C) and oxygen to carbon (O/C) ratios.

Figure 8:
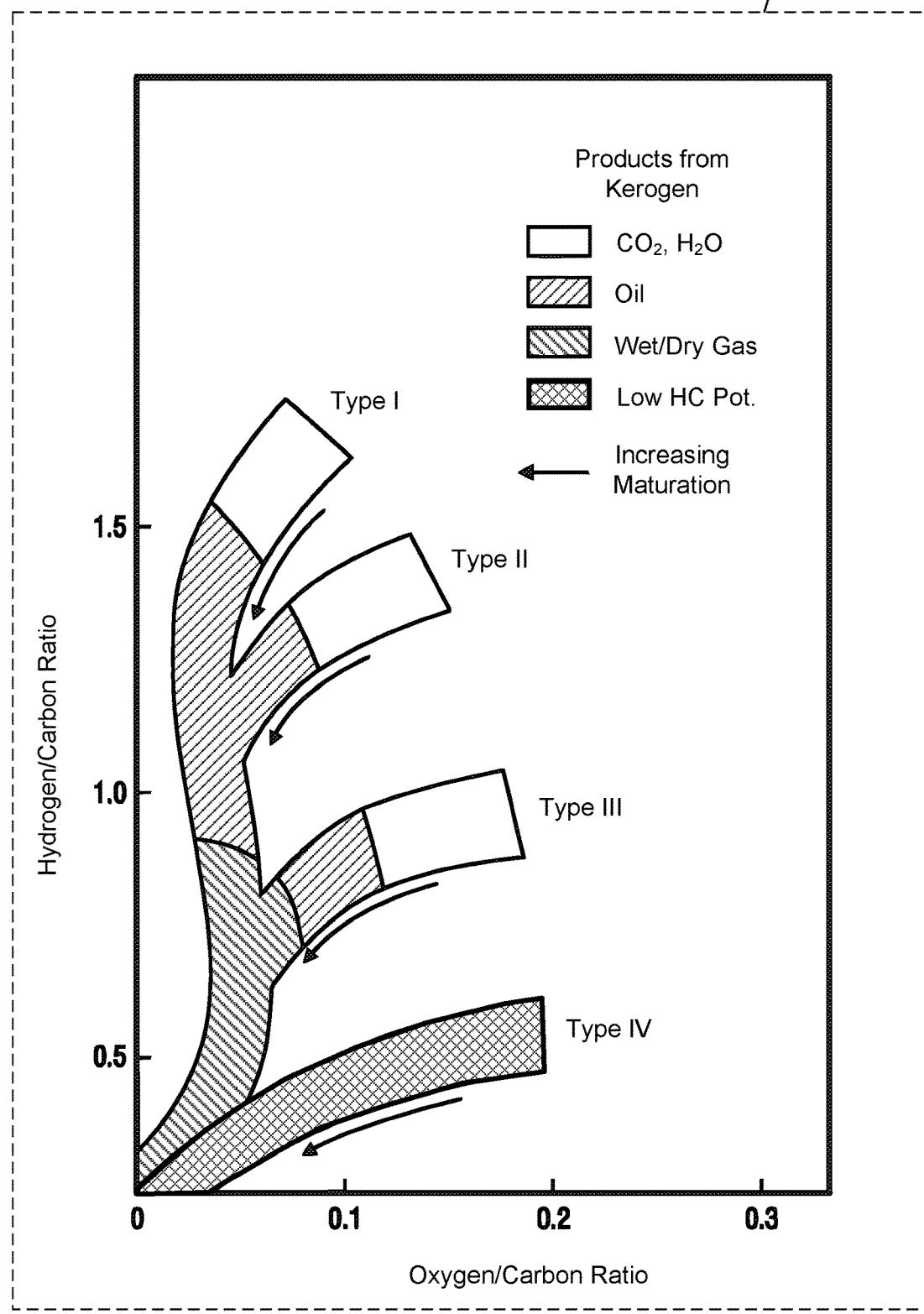
FIG. 8 illustrates an example of a graphical user interface.

FIG. 8 shows an example of a graphical user interface (GUI) 800 as rendered to a display 801 (e.g., a display operatively coupled to a system such as the system 560 of FIG. 5). The GUI 800 shows a Van Krevelen diagram with various types of kerogen. Type I (predominantly lacustrine) and type II (predominantly marine) kerogens have high H/C and low O/C ratios, and they are capable of generating oil and gas as progressive burial in the subsurface increases their temperature and pressure. Type III (predominately terrestrial) humic kerogen has lower H/C and higher O/C ratios than types I and II. It generates natural gas but little or no oil. Type IV kerogen tends to be recalcitrant organic matter that has been pyrolyzed, oxidized and/or recycled. It tends to have the lowest H/C ratios and low potential for generation of substantial amounts of oil and/or gas. A fifth class, type IIS, sulfur-rich type II kerogen, with greater than approximately 8 percent weight sulfur, can be included in such a kerogen classification scheme.

Figure 9:
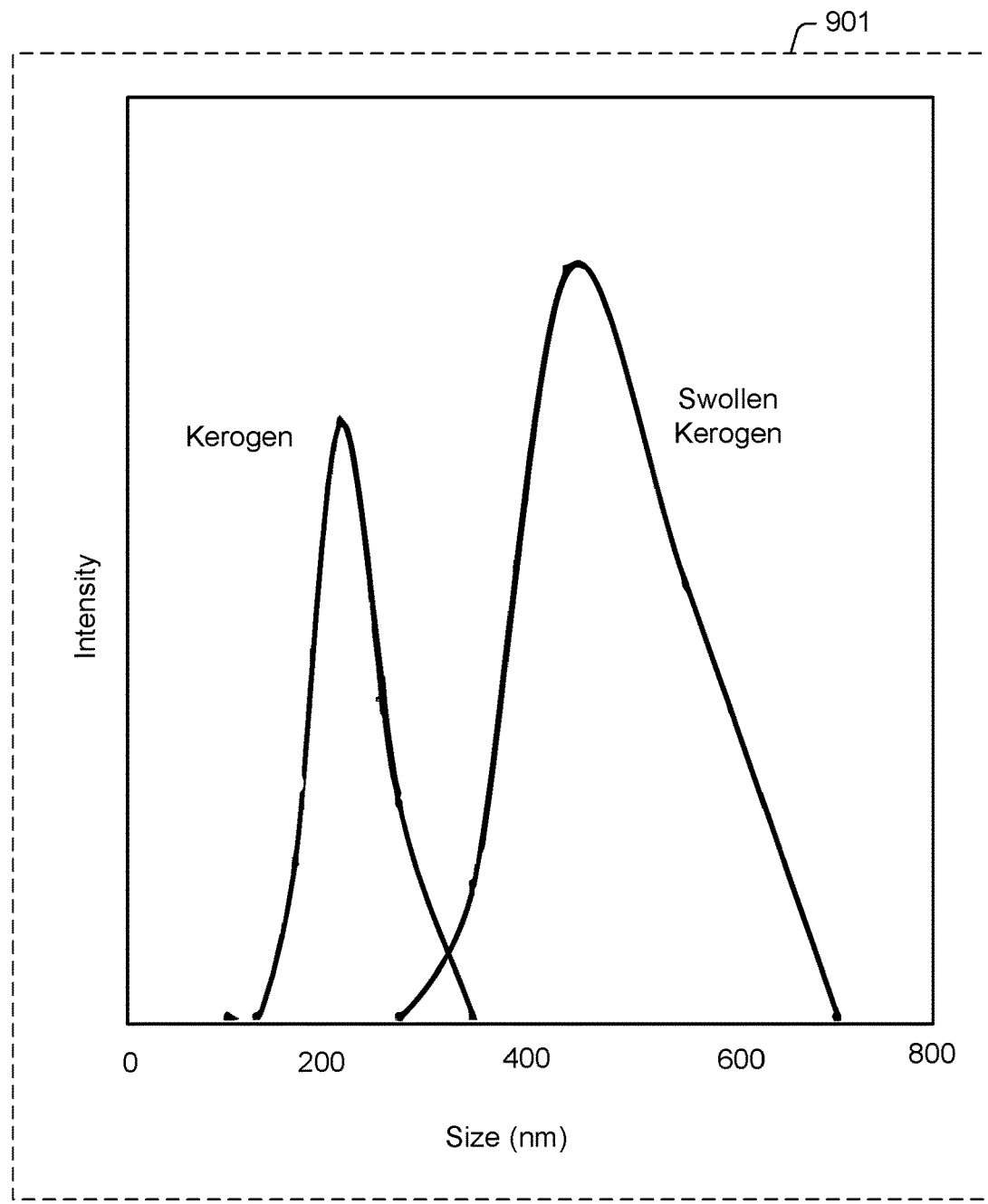
FIG. 9 illustrates an example of a graphical user interface.

FIG. 9 shows an example of a graphical user interface (GUI) 900 as rendered to a display 901 (e.g., a display operatively coupled to a system such as the system 560 of FIG. 5). In the GUI 900, size distribution for unswollen and swollen kerogen particles obtained from dynamic light scattering (DLS) are shown. As explained in Pathak et al., Kerogen Swelling and Confinement: Its implication on Fluid Thermodynamic Properties in Shales, Scientific Reports, volume 7, Article number: 12530 (2017), kerogen particles were swollen by equilibration with excess decane for 24 hours where mean particle size of the kerogen particles was 219.78 nm before swelling and 448.25 nm after swelling. The polydispersity (PdI)=the square of the standard deviation/mean diameter was close to 0.05 indicating a monodisperse sample and suitability of DLS in the size measurement of kerogen particles. If kerogen of certain types is in contact with oil (a multi-component mixture of hydrocarbons), kerogen may preferentially uptake some components of oil more than others. The overall ability of an oil to swell kerogen is determined by the contributions of the various components that make up the oil.

As to graphitic carbon structure particles in kerogen, mean particle sizes can be greater than those of the aforementioned type I and type II particles, whether swollen or un-swollen. For example, with a transmitter frequency of approximately 27 kHz, resonance occurs for particles sizes of the order of 100 microns. As to smaller particles, such as 10 nm particles, frequency would be much higher, for example, around 1 MHz. As mentioned, volume sensitivity of a tool can be related to frequency, in terms of depth of investigation, for example, due to skin effects (e.g., eddy currents, etc.).

As mentioned, kerogen is a mixture of organic chemical compounds that make up a portion of the organic matter in sedimentary rocks. The chemical composition of kerogen can vary distinctively from sample to sample. For example, kerogen from the Green River Formation oil shale deposit of western North America includes elements in the proportions carbon 215:hydrogen 330:oxygen 12:nitrogen 5:sulfur 1.

As shown in FIG. 8, type III kerogen, which can be referred to as humic, can be characterized with a hydrogen to carbon ratio less than unity and, for example, with oxygen being present, for example, at an oxygen to carbon ratio in a range from approximately 0.03 to approximately 0.2. A sample of type III kerogen may resemble wood or coal. The amount of hydrogen can be low due to the presence of extensive ring and aromatic systems. Kerogen type III tends to be formed from terrestrial plant matter that is lacking in lipids or waxy matter. It can form from cellulose, the carbohydrate polymer that forms the rigid structure of terrestrial plants, lignin, a non-carbohydrate polymer formed from phenyl-propane units that binds the strings of cellulose together, and terpenes and phenolic compounds in the plant. Type III kerogen involving rocks tend to be relatively low in productivity upon pyrolysis, which tends to make them less favorable deposits for oil generation.

As to type IV kerogen, it tends to have a lower upper limit as to hydrogen to carbon ratio than type III kerogen, for example, less than approximately 0.7 (see, e.g., FIG. 8). Type IV kerogen contains mostly decomposed organic matter in the form of polycyclic aromatic hydrocarbons, which tend to lack potential to produce hydrocarbons.

In various carbonaceous materials, aromaticity can be correlated to H/C ratio as aromatic systems tend to have lower H/C ratios than aliphatic systems. As an example, UV-visible spectroscopy may be utilized to measure properties of kerogen that can indicate maturity. For example, UV-visible spectroscopy can measure spectra that can be defined in part by Urbach tail phenomenology, which can include an Urbach decay width Eo. For example, an absorption coefficient α can be given as:

$$\alpha(\omega) \sim \exp\left(\frac{\hbar\omega}{Eo}\right)$$

An Urbach tail can be an exponential band tail observed in impure crystals and disordered materials. A correlation exists between Eo and H/C ratio for type II and type III kerogen. Maturation tends to result in a decrease in H/C ratio and an increase in aromaticity. Correlations of Eo with H/C ratio and with aromaticity indicate that UV-visible spectroscopy can be utilized as a rapid measurement of maturity; noting that maturity tends to be measured by vitrinite reflectance (Ro), in which the amount of light reflectance of a particular organic carbonaceous maceral, vitrinite, is used (when present in the natural carbonaceous material) to indicate maturity. When vitrinite is not present in kerogen, kinetically derived models may be utilized to estimate the effective reflectance values based on thermal history (see, e.g., Ferralis et al., Direct Correlation Between Aromatization of Carbon-Rich Organic Matter and Its Visible Electronic Absorption Edge, Carbon 88 (July 2015): 139-147). As an example, a method can include generating a log that is related to an Urbach tail phenomenology that characterizes particles in a formation. As an example, a tool can include circuitry that can acquire information such as absorption information (e.g., consider a downhole tool that includes an emitter and a detector).

Since terrigenous plants evolved in the Silurian Period, vitrinite does not exist in rocks older than the Silurian geologic period. Before this time, bioclasts such as graptolites can be used instead of vitrinite to determine thermal maturity of the rock. An article by Petersen et al., Reflectance measurements of zooclasts and solid bitumen in Lower Paleozoic shales, southern Scandinavia: Correlation to vitrinite reflectance, International Journal of Coal Geology, Vol. 114, 30 Jul. 2013, pp. 1-18, which is incorporated by reference herein, describes a relationship between vitrinite reflectance and bioclast material that can be used to ascertain the thermal maturity of rocks older than the Silurian Period. As an example, a method can include utilizing such a relationship to ascertain the thermal maturity of rocks older than the Silurian Period. For example, consider an induction tool system that can generate a maturity log that can include maturity indexes of rock from one or more periods.

As to aromaticity, polycyclic aromatic hydrocarbons (PAHs, also polyaromatic hydrocarbons or polynuclear aromatic hydrocarbons) are hydrocarbons—organic compounds containing carbon and hydrogen—that are composed of multiple aromatic rings (organic rings in which the electrons are delocalized). The simplest such chemicals are naphthalene, having two aromatic rings, and the three-ring compounds anthracene and phenanthrene.

PAHs can be converted to graphitic carbon structures (e.g., graphite, diamond, etc.). For example, naphthalene, anthracene, pentacene, perylene, and coronene can be submitted to high temperatures and pressures (e.g., 1500 degrees C. at 8 GPa) to form graphitic carbon structures such as graphite and diamonds.

The nature of the initial compounds affects products of different stages of carbonization and first steps of graphitization. However, this becomes hardly discernible in the final stages of graphitization above 1000 degrees C. Above 1200 degrees C., graphite with high crystallinity forms. The temperature of the beginning of diamond formation does not seem to be influenced by the nature of the initial PAH and is equal to approximately 1280 degrees C. for the aforementioned PAHs. Diamonds formed from the PAH tend to be relatively high-quality 5 to 40 µm single crystals.

As mentioned, a formation can include vitrinite, which is a component of coals and various sedimentary kerogens. The vitrinite group, which includes various individual vitrinite macerals, is the most common component of coals. Vitrinite is also abundant in kerogens that are derived from the same or similar biogenic precursors as coals, namely land plants and humic peats. Vitrinite can form diagenetically by the thermal alteration of lignin and cellulose in plant cell walls. It is therefore common in sedimentary rocks that are rich in organic matter, such as shales and marls with a terrigenous origin, or some terrigenous content. Conversely, carbonates, evaporites and well-sorted sandstones tend to have very low vitrinite contents. Vitrinite is absent in pre-Silurian rocks because land plants had not yet evolved.

Various types of processes can result in metamorphosis. For example, various schists are derived from clays and muds that have passed through a series of metamorphic processes involving the production of shales, slates and phyllites as intermediate steps. Graphitic carbon materials can be found in rocks such as schists. Schists are known to be formed in some regions from clastic marine sediments.

Graphitic carbon materials in sediments can differ. For example, an article by Ohtomo et al., Evidence for biogenic graphite in early Archaean Isua metasedimentary rocks, Nature Geoscience 7(1), December 2013 (DOI: 10.1038/ngeo2025), which is incorporated by reference herein, describes differences between graphite in metasediment and in secondary carbonate vein samples; noting that transmission electron microscope observations showed that graphite in the schist occurred as nanoscale polygonal and tube-like grains, in contrast to abiotic graphite in carbonate veins that exhibited a flaky morphology. Thus, differences are noted in aspects such as respective morphologies, internal graphite nanostructures and stacking defects. In particular, examined metasediment included graphitic polygonal grains and tube-like structure where some lattice fringes showed distortion at surfaces and inside graphite grains (onion-like structures). Such features were found in samples from both northern and southern sections of the region. Sheeted flakes were a noted to be a dominant morphology of secondary graphite; whereas, polygonal grains and tube-like structures were absent. Sheeted flakes indicated well-layered structures overall; although, the surfaces and edges of flakes were sometimes curled where such curled structures disappeared on the inner portions of sheeted flakes. The structural changes from the surface to the inner portions of the sheeted flakes indicate that initial deposition of distorted graphite (on the current surface) was followed by ordered deposition of successive layers of graphite. In contrast, curled structures were present in the inner portions of graphite grains in the metasediment, providing an indication that its origin is different from that of the secondary graphite. Polygonal and tube-like structures in graphite-rich schist were likely generated during maturation processes of organic matter. A minor portion of heterogeneity in the graphitic carbon structural order could be caused by the secondary effects of surrounding minerals and/or dynamic fluid flow processes during metamorphism.

Graphitization of biogenic organic compounds in geological sediments is dependent on temperature and pressure. Distorted structures and the diffusion of graphene sheet stacking can be found in pyrolysed and pressurized organic compounds. Such precursors can include non-graphitizing carbon, such as non-planar carbon ring compounds associated with abundant pores. At high pressures, organic matter in the presence of various hydrocarbons mixed with non-graphitizing carbon may be forced into parallelism, thereby facilitating formation of hexagonal graphene sheets; whereas, crystal lattice remains distorted and the graphene sheet stacking may display diffusion. Biogenic organic matter that includes various molecules and functional groups can be favored as a precursor of graphite observed in the metasediment.

In an article by Bustin et al., Mechanisms of graphite formation from kerogen: experimental evidence, International Journal of Coal Geology, Volume 28, Issue 1, October 1995, Pages 1-36, which is incorporated by reference herein, describes how strain energy can facilitate additional flattening of existing pores, with likely mechanical rotation of stacks of basic structural units (BSUs) and rupturing of pore walls. Such strain can facilitate coalescence of pores, parallelism of BSUs and, therefore, the growth of aromatic sheets (e.g., by coalescence of neighboring pores), leading to the formation of graphite. Thus, while temperatures and pressures have been mentioned, additionally a component of the activation energy for graphitization, in nature, can be provided by strain energy. Bustin et al. state that, through a comparison of anthracite and high volatile bituminous coal samples tested under various conditions, anthracite is more graphitizable than high volatile bituminous coal.

As mentioned, maceral maturity can be estimated by vitrinite reflectance (Ro). Vitrinite reflectance (Ro) can provide information on carbon, hydrogen and nitrogen composition of materials such as coal, for example, consider type of coal (e.g., lignite, brown coal, bituminous coal, anthracite or graphite).

An article by Revil et al., Induced polarization response of porous media with metallic particles—Part 6: The case of metals and semimetals, Geophysics, Vol. 82, No. 2 (March-April 2017); P. E97-E110 (10.1190/GEO2016-0389.1) ("Revil Part 6") is incorporated by reference herein and describes induced polarization spectra with clean sand mixed with metallic particles (either silver, graphite, copper, steel, magnetite, or pyrite particles). Graphite described to be a semi-metal made of carbon and being an electronic conductor with "electronic properties somehow in between a metal and a semiconductor, i.e., characterized by a small overlap between the bottom of the conduction band and the top of the valance band". The experiments used a narrow and unimodal grain size distribution for the metallic particles where resulting polarization spectra displayed polarization peaks in the phase where fitting was performed with a Cole-Cole complex conductivity model.

Revil Part 6 performed measurements in a frequency range from 1 mHz to 45 kHz. As to two experiments with graphite with a mean particle size of 16.1 mm, peak frequencies of 0.05 Hz and 0.2 Hz resulted (-phase in mrad). In the fifteen experiments, peak frequency was from 0.04 Hz to 100 Hz. Phase at the peak frequencies versus the weight fraction of metallic particles was shown to vary in a relatively linear manner on a log-log plot and Cole-Cole relaxation time versus mean grain radius or size of the metallic particles or metallic body was shown to vary in a relatively linear manner on a log-log plot. Revil Part 6 states that spectra can be fitted by a Cole-Cole model in complex conductivity, which is attributed to investigation of very narrow particle size distributions for the metallic particles, where the Cole-Cole relaxation time was roughly related to the mean size of the metallic particles.

As explained, organic mudrock (sometimes called shale gas or shale oil) reservoirs include hydrocarbons derived in-situ from organic matter. Without thermally mature organic matter, the shale is, in general, not a commercial resource of hydrocarbons. Kerogen derived from living matter deposited concurrent with the sediments matures as a function of temperature and pressure which are also functions of burial depth. As the kerogen matures, first biogenic gas, then oil, then predominately methane gas is evolved and fills available pore space or is adsorbed to the remaining kerogen in the formation. At full maturity, kerogen can have been largely converted to aromatic carbon rings, for example, in a graphitic carbon structure, along with $CO_2$. Therefore, the relative content of graphitic carbon structures (e.g., aromatic carbon structures as found in mature kerogen) of kerogen can be an index for the maturity of the kerogen.

Determining the thermal maturity of the kerogen gives an indication of the type of hydrocarbon that may be produced and the volume of kerogen in the formation is an indication of the volume of hydrocarbons that may be recovered.

As an example, a method can provide for volume and maturity of the kerogen, for example, from various measurements (see, e.g., US Patent Application having Publication No. 2016/0186556, to Rasmus, entitled "Method and apparatus for evaluation of hydrocarbon-bearing reservoirs", published 30 Jun. 2016, which is incorporated by reference herein ('556 application)) and, as described herein, additional log measurements. As mentioned, per the '308 application, the dielectric permittivity has been shown to be large on the order of 10,000 to 100,000,000 when certain clays and metallic particles are present in the formation of the right size, shape and percent volume (see also the '293 application and the '088 application).

As an example, one or more tools may be utilized, which can include features of the system 300 and/or the system 400. As an example, consider a measurement such as inelastic carbon measurement from spectroscopy using a tool such as a LITHOSCANNER™ tool. In addition, a set of measurements can be acquired using a tool such as the RTSCANNER™ tool, a THRUBIT tool or an AIT™ tool where such a set of measurements can be utilized to determine formation dielectric constant (e.g., via inversion from induction measurements). The use of the inelastic carbon measurement with traditional measurements to compute the volume of immature and the volume of mature kerogen or graphite in organic mudrocks is described in the '556 application.

As an example, lithology scanning technology may be employed to acquire and analyze data. For example, consider the LITHOSCANNER™ technology marketed by Schlumberger Limited (Houston, Tex.). As an example, a LITHOSCANNER™ tool may be a gamma ray spectroscopy tool. Such a tool is an example a lithology scanner tool (e.g., or lithology scanning tool). As an example, a workflow may include emission of neutrons by a pulsed neutron generator (PNG) of a tool to induce emission of gamma rays from a formation via interactions such as inelastic scattering interactions and thermal neutron capture interactions, which can produce gamma rays with a specific set of characteristic energies. In turn, gamma rays may be detected by a $LaBr_3$: Ce scintillator coupled to a high-temperature spectroscopy photomultiplier, producing signals that can be integrated, digitized, and processed by a high-performance pulse-height analyzer. Such an analyzer may determine, for example, pulse height (proportional to energy) of individually detected gamma rays and accumulate pulse-height histograms (spectra) that tally counts versus pulse height. Spectra may be acquired, for example, during and after each neutron burst, which helps to enable separation of inelastic and capture gamma rays. As an example, an individual spectrum may be decomposed into a linear combination of standard spectra from individual elements, which can involve adjustment for one or more environmental and/or electronic factors. As an example, coefficients of linear combination of standard spectra may be converted to elemental weight fractions, for example, via a modified geochemical oxides closure model, an inversion approach, etc. As to interpretation, various approaches may be implemented to generate mineralogy and lithologic fractions from the elemental concentration logs. As an example, a sequential SpectroLith processing approach may be used, which is based on the derivation of empirical relationships between elemental concentrations and mineral concentrations. As another example, an iterative inversion technique may be implemented (e.g., consider the TECHLOG® QUANTI™ multicomponent inversion ELAN module).

In various examples, a method or methods can use the volume of immature and the volume of mature kerogen or content of graphitic carbon structures in organic mudrocks with a formation dielectric measurement to compute the maturity index or vitrinite reflectance (Ro) in organic rich mudrocks on a depth by depth basis where Ro can be a core based index of kerogen maturity.

Vitrinite reflectance is a measure of the percentage of incident light reflected from the surface of vitrinite particles in a sedimentary rock. It is referred to as % Ro (or Ro). Results are often presented as a mean Ro value based on vitrinite particles measured in an individual sample.

The maturation of vitrinite is a kinetic process. The relationship between % Ro and hydrocarbon generation is dependent on the chemistry of the vitrinite as well as the chemistry of the kerogen.

Oil and gas zone boundaries can be established using vitrinite reflectance data. The boundaries are approximate and vary according to kerogen type. For example, approximate boundaries can be for kerogen types I, II, and III.

Time-temperature relationships and mixing of various sources of organic matter may alter these boundaries.

As an example, a method can include accounting for one or more types of kerogen, which may include graphitic carbon content (e.g., aromatic carbon structures as found in mature kerogen). Such a method may be characterized by a hydrogen to carbon ratio, a carbon to hydrogen ratio, a percentage of mass or volume of PAHs, a percentage of mass or volume of graphitic carbon structures, vitrinite, etc.

As an example, a system can include an induction tool conveyable via one or more pieces of equipment downhole that can operate at a plurality of frequencies, which may be selectable based on one or more conditions, criteria, commands, etc. As a measurable effect may be an induced polarization effect that is a resonant effect where resonant frequency is proportional to size and to a lesser extent shape of a particle, a tool can be operable over a range of frequencies (e.g., selectable frequencies and/or selectable ranges). For example, consider a tool with operating frequencies between approximately 1 kHz and approximately 1 MHz (or more).

As an example, a tool may include a resonance detector. Electrical resonance occurs in an electric circuit at a particular resonant frequency when the impedances or admittances of circuit elements cancel each other. In some circuits, this happens when the impedance between the input and output of the circuit is almost zero and the transfer function is close to one.

Various antenna designs are based on the resonance principle, which relies on the behavior of moving electrons, which reflect off surfaces where the dielectric constant changes, in a fashion similar to the way light reflects when optical properties change. In these designs, the reflective surface is created by the end of a conductor, normally a thin metal wire or rod, which in the simplest case has a feed point at one end where it is connected to a transmission line. The conductor, or element, is aligned with the electrical field of the desired signal, normally meaning it is perpendicular to the line from the antenna to the source (or receiver in the case of a broadcast antenna).

As an example, resonance can occur within a medium or media. For example, where a system involves emission of electromagnetic energy that penetrates a medium or media, resonance may occur within that medium or media, which may be due to composition of a medium or media and/or due to interfaces between media. As an example, in microwave sintering of metal powder compacts, resonance can occur due to effective dielectric and magnetic properties of the compacts. Microwave heating can exhibit resonant behavior which facilitates rapid densification of powder metals in a way similar to flash sintering. Whether resonance is favorable or unfavorable, it may be controlled, for example, via control of intensity and/or frequency of the electromagnetic radiation (e.g., adaptive control over the intensity and/or frequency of the microwave radiation).

As an example, an induction tool can include circuitry that can detect resonance and/or control with respect to resonance. For example, consider a frequency scan that can detect a resonant frequency, which may be desirable for performing measurements. As an example, such a resonant frequency may be utilized to improve measurements where such measurements can be utilized to determine one or more aspects of kerogen within a formation (e.g., amount of type or types). As an example, resonance may become more prominent in a formation as kerogen is of latter types, particularly types III and IV kerogen (e.g., graphitic carbon content). As an example, a resonance analysis may be performed to determine kerogen type or one or more other aspects of kerogen. As an example, a resonance analysis may be performed to determine particle characteristics, which may include one or more of type, size, shape, density, orientation, etc.

As an example, a method can include determining a resonant condition where frequency is proportional to particle size and, for example, to a lesser extent shape of particles. As an example, a method can include determining resonant conditions, which may correspond to different particle characteristics (e.g., different particles, different distributions of particles, different shapes, different sizes, different orientations, etc.). As an example, a particle may be a graphitic carbon particle that is a kerogen particle (e.g., as may be present to a greater extent in a type IV kerogen particle, etc.).

As mentioned, kerogen particles of types I and II, as well as III, may exhibit swelling from one or more oils (e.g., oil components). As an example, a measurement technique can be sensitive to particles, particularly graphitic carbon particles; though, sensitivity may be exhibited as to other types of kerogen particles, which may be swollen or un-swollen.

As an example, a method may involve core based tri-axial or axial induction type measurements with core based spectroscopy lab measurements, for example, operating in a 1 kHz to 1 MHz range or other range.

As an example, dielectric induction magnitude can be sensitive to clay type, wettability and pyrite in addition to graphitic carbon inclusions (see, e.g., Misra et al., Interfacial polarization of disseminated conductive minerals in absence of redox-active species: Part 1: Mechanistic model and validation, Geophysics, March 2016, Vol. 81, No. 2, pp. E139-E157, also referred to as Misra Part 1).

As an example, induced polarization (IP) or dielectric response can be sensitive to one or more of particle size, shape and percent volume for aforementioned types as may be applicable to effective medium (see, e.g., Revil et al., Induced polarization response of porous media with metallic particles—Part 5: Influence of the background polarization, Geophysics, March 2017, Vol. 82, No. 2, pp. E77-E96, also referred to as Revil Part 5).

As an example, an approach as in the '556 application may be utilized where a log based nuclear spectroscopy inelastic carbon yield or dry weight are used along with other log measurements to determine the graphite and immature kerogen volumes in organic mudrocks.

As an example, a method can include, alternatively or additionally, use of a formation dielectric inverted from one or more induction measurements to derive a log based kerogen maturity index.

As an example, a method can include inverting induction logging data for evaluating the properties of a formation where the data include induction voltage measurements obtained from a tool placed close to the formation of interest where the method can include (a) defining a relationship relating the induction voltage to wave number, dielectric permittivity and conductivity; defining a cubic polynomial expansion of the relationship; and solving the cubic polynomial relationship using the voltage measurements to obtain values for conductivity that includes skin-effect adjustment, and apparent dielectric permittivity; and (b) using the obtained values for conductivity and apparent dielectric permittivity to derive a simulated value of induction voltage; determining the difference between the simulated value of the induction voltage and the measured induction voltage; and iteratively updating the values of conductivity and dielectric permittivity used for the derivation of the simulated value of induction voltage to minimize its difference with respect to the measured value. As mentioned, one or more inversion techniques such as in the '308 application may be utilized.

As an example, an equation such as below, may be utilized to relate induction voltage to wave number, dielectric permittivity and conductivity:

$$k = \frac{\omega}{c}\sqrt{\mu_r}\sqrt{\varepsilon_r + i\frac{\sigma}{\omega\varepsilon_0}}$$

where k is the wave number, ω is the circular frequency, c is the speed of light in a vacuum, $\mu_r$ is the relative magnetic permeability, $\varepsilon_r$ is the relative permeability and $\varepsilon_0$ is the absolute dielectric permittivity of a vacuum and σ is conductivity. As such, various electromagnetic material properties can characterize a formation. As an example, $\mu_r$, the relative magnetic permeability may be set to unity. As to dielectric permittivity, it includes the relative permittivity without units and the absolute dielectric permittivity of a vacuum, which is approximately $8.8542 \times 10^{-12}$ As/Vm. In some instances, with approximations and/or assumptions, the wave number equation can be reduced to:

$$k \approx \sqrt{i\omega\mu_0\sigma}$$

In such an approximation approach, the squared wave number is directly proportional to the electrical conductivity. The real and imaginary part, or the R- and the X-signal contributions, may in some instances be assumed to be equivalent. If higher order terms are negligible, the X-signal term is independent. The contribution of the real, in-phase part may be superposed on the leading term, causing a distortion that is attributed to the skin effect. By itself, this distortion cannot be filtered from the in-phase signal. However, the quadrature signal constitutes the same signal as the distortion and this can be used to adjust the apparent conductivity.

The imaginary part can be directly and independently measured as quadrature signal. As part of advanced induction processing it can be added to the leading in-phase term, where it will effectively compensate for the skin-effect distortion. Such an adjustment can be used in an array-induction tool, providing the skin-effect-adjusted apparent conductivity. Such an approach can give adequate results for conductivities below approximately 100 mS/m (e.g., resistivities above 10 Ωm). For more conductive formations the skin-effect adjustment rapidly becomes larger, so that around 1000 mS/m (e.g., resistivity of 1 Ωm) it is around 25% for a 27 inch (e.g., 0.68 m) to 39 inch (e.g., 0.99 m) receiver-coil pair. In this situation higher-order terms of the wave number tend to be no longer negligibly small. As explained herein, formation properties can be frequency dependent to some extent and/or a formation may respond differently to different frequencies (e.g., as to resonance, etc.).

As an example, an inversion of a set of wavenumber equations can be iterative and provide results for apparent electric conductivity and dielectric permittivity. Measured signals can include two independent, real-valued signals that are inverted for two independent, real valued quantities: dielectric permittivity and electric conductivity. Naively, an inversion can be a two-dimensional, real-valued problem with four independent sensitivity derivatives. However, target quantities constitute real and imaginary part of a complex-valued parameter. The measured voltage signal is a complex-valued function of this parameter; it can be cast as a holomorphic function that obeys the Cauchy-Riemann identities.

The electromagnetic Green function describes the complex-valued transmitter receiver signals as holomorphic function of the complex dielectric constant. Hence the in-phase (R-) and quadrature (X-) signals, UR and UX, as real and imaginary part of the received induction signal obey Cauchy-Riemann identities in their dependence on the electric conductivity and dielectric permittivity:

$$\frac{\partial UR}{\partial \sigma} = \frac{\partial UX}{\omega\varepsilon_0 \partial \varepsilon_r}$$

$$\frac{\partial UX}{\partial \sigma} = -\frac{\partial UR}{\omega\varepsilon_0 \partial \varepsilon_r}$$

The in-phase and quadrature measurements, UR and UX can be simultaneously inverted for the relative dielectric permittivity and the electric conductivity. As an alternative to a conductivity-conversion method or the cubic polynomial inversion, a method may use an iterative inversion algorithm. Such an iterative inversion algorithm provides considerable advantages: it tends to be numerically more stable and converges rapidly and involves the explicit Green-function expressions.

As an example, a method can include measurement of quadrature signal with a comparable accuracy and precision as an in-phase-signal measurement (e.g., via an induction tool). In such a method, the wave number may be considered in its complete form, including the dielectric permittivity (e.g., without an induction approximation of negligible permittivity).

As an example, an iterative inversion algorithm can implicitly use the fact that permittivity and conductivity are combined into a single, complex-valued quantity and that the R- and X-signal combined as complex-valued quantity constitute a holomorphic function of the complex permittivity. The holomorphic character of the signal renders the Cauchy-Riemann identities valid in the signal sensitivity with respect to the wave number.

As mentioned, a method can include, for example, performing an inversion for formation dielectric values from induction and propagation measurements.

An approach to estimating kerogen maturity can be from vitrinite reflectance, Tmax, and Rock-Eval pyrolysis core based techniques. For example, the vitrinite reflectance (or Ro or VR) can provide for identifying the maximum temperature history of sediments in sedimentary basins. The reflectance of vitrinite was first studied by coal explorationists attempting to diagnose the thermal maturity, or rank, of coal beds. As to study of sedimentary organic matter metamorphism from kerogens to hydrocarbons, vitrinite reflectance is sensitive to temperature ranges that largely correspond to those of hydrocarbon generation (e.g., 60 to 120 degrees C.). This means that, with a suitable calibration, vitrinite reflectance can be used as an indicator of maturity in hydrocarbon source rocks. Generally, the onset of oil generation is correlated with a reflectance of 0.5-0.6% and the termination of oil generation with reflectance of 0.85-1.1%. The onset of gas generation ("gas window") is associated with values of 1.0-1.3% and terminates around 3.0%. However these generation windows vary between source rocks with different kerogen types (vitrinite tends to be relatively abundant in Type III kerogen-rich source rocks), so a conversion to "Transformation Ratio" (TR) can be applied to create a kerogen-specific maturity parameter. The vitrinite reflectance value represents the highest temperature that the vitrinite maceral (and source rock) has experienced, and may be used in 1D burial modelling to identify geological unconformities in sedimentary sections. Vitrinite reflectance data is presented in units of % Ro, the measured percentage of reflected light from a sample which is immersed in oil (% Ro=% reflectance in oil).

As an example, a method can include determine maturity of material based on log measurements, which may give a continuous depth based kerogen maturity. Such an approach is an improvement to a discrete core based kerogen maturity in that the entire organic rich interval can be evaluated for maturity. Kerogen maturity can gives an adequate indication of what fluid types may be produced such as, for example, oil, gas, or condensate. It can also give burial history when mapped on a basin wide basis (e.g., from multiple logs in different boreholes, etc.).

As an example, a method can include determining kerogen thermal maturity by combining various types of measurements, which can, at least in part, provide for formation dielectric values.

As explained, an induction tool can measure in-phase (R) and out-of-phase (X) voltages induced in a formation by an antenna type transmitter (e.g., coil, etc.). In various types of formations, the X signal is a function of the skin effect which increases with formation conductivity. However, in other types of formations, particularly those with a relatively large dielectric value, the R and X signals are perturbed by this formation characteristic. For example, graphite embedded within a formation will give rise to abnormally large dielectric constants (see, e.g., Misra et al., URTeC: 2163422 Complex Electrical Conductivity of Mudrocks and Source-Rock Formations Containing Disseminated Pyrite, Schlumberger, Unconventional Resources Technology Conference (URTeC), San Antonio, Tex., USA, 20-22 Jul. 2015, which is incorporated by reference herein).

As an example, an induction tool can be defined with respect to a coordinate system, which may be, for example, a Cartesian coordinate system, a cylindrical coordinate system, a spherical coordinate system or other type of coordinate system. As an example, for a Cartesian coordinate system with orthogonal x, y and z axes, induction measurements (e.g., magnetic field measurements, etc.) can be described as xx, yy, zz, xy, etc., where the first script can refer to a transmitter orientation and the second script refers to a receiver orientation where z can be along a longitudinal axis (e.g., a longitudinal axis of an induction tool).

An inversion of induction log data can be performed using specialized circuitry such as a specialized computer system that operates on processor-executable instructions written to simultaneously solve for the effective formation conductivity and dielectric constant from zz or transverse induction measurements. As to zz measurements, consider a tri-axial tool (e.g., in an x, y and z coordinate system) that can make xx, yy, zz, and xy measurements. Such an inversion can be run in known organic mudrocks to determine the formation dielectric constant. In various trials, the output demonstrated that the dielectric constant varied and was abnormally large in certain organic mudrocks but not others. The value of formation dielectric has a positive correlation to the ratio of the graphitic carbon volume to the immature volume of kerogen. Such a relationship may be established, for example, utilizing a technique as in the aforementioned '308 application.

Figure 10:
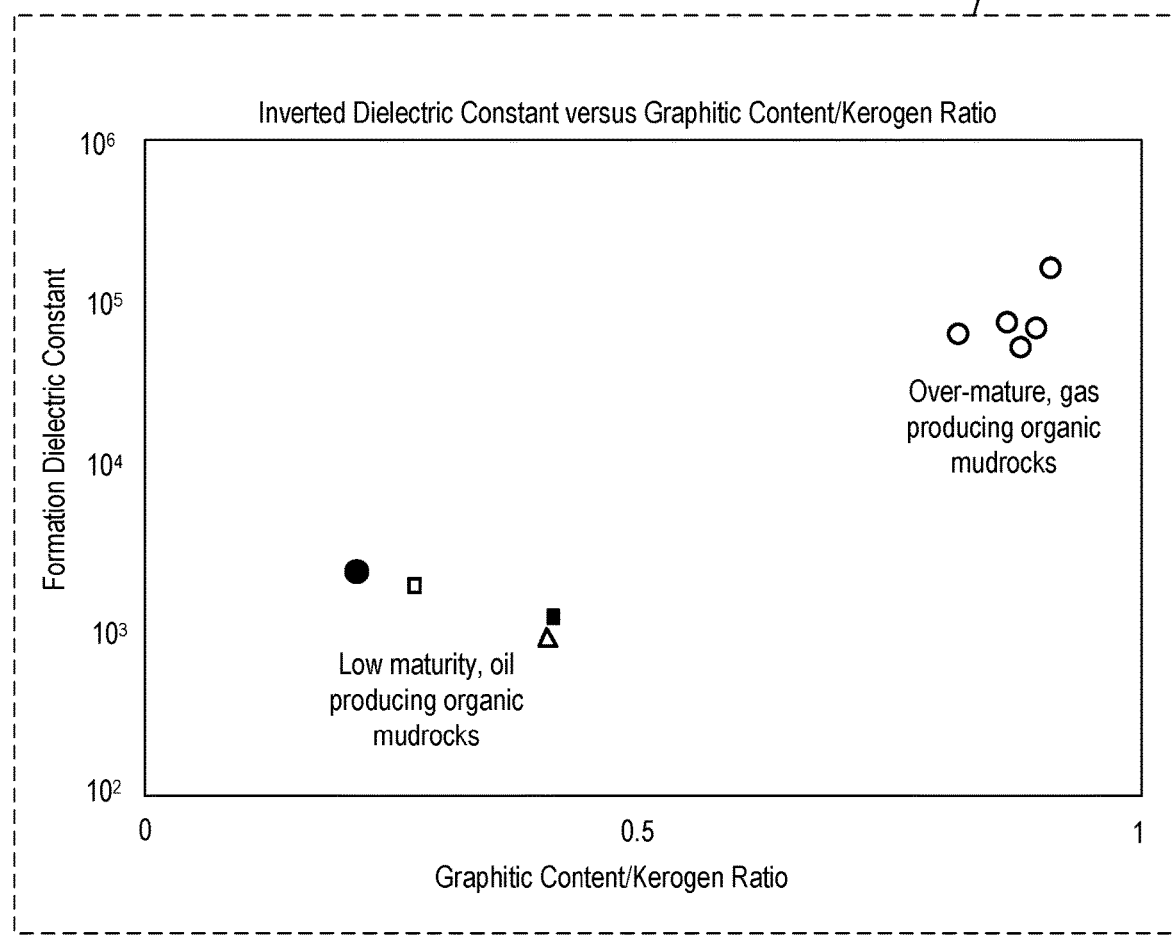
FIG. 10 illustrates an example of a graphical user interface.

FIG. 10 shows an example GUI 1000 rendered to a display 1001, where the GUI 1000 includes a crossplot of results showing positive correlation of formation dielectric constant and graphitic carbon/immature kerogen ratios for low and high maturity organic mudrock zones.

As shown in FIG. 10, high and overmature organic mudrocks tend to have a Ro value of 4-5 while low maturity organic mudrocks tend to have Ro values of 0.7-0.9; noting that there are other organic mudrocks with intermediate values of Ro that are not shown in the crossplot of FIG. 10. In the GUI 1000, the crossplot shows a trend from the lower left to the upper right corners of the crossplot that corresponds to a positive correlation with Ro. A measure of the distance along this trend was devised such that the length is a function of the distance from the lower left corner to the upper right corner appropriately scaled.

As an example, consider the following equation for calculating an Ro index value from formation dielectric constant and graphite/kerogen ratio (e.g., graphitic carbon/kerogen ratio):

$$Ro \text{ index} = 1.5 * \left( sqrt\left( (\log(\text{formation dielectric constant}) - 3)^2 + 2.5 * \left(\frac{\text{graphite}}{\text{kerogen}}\text{ratio}\right)^2 \right) \right)$$

The foregoing equation can be referred to as a fitting function, which is an example of a fitting function. As an example, an equation can include a volume fraction of graphitic carbon term, for example, with respect to kerogen. As an example, a Ro value or values (e.g., Ro index value or values) can be determined using the foregoing equation, which may, for example, be utilized for log generation. For example, consider a kerogen maturity log that includes a plurality of Ro values determined according to the foregoing equation which may be rendered to a display, to paper, etc., with respect to a dimension such as depth, which can be measured depth, vertical depth, etc., or optionally in a multi-dimensional manner (e.g., a 3D rendering of a trajectory of a borehole with color or other indicia of kerogen maturity as represented by Ro values. As an example, a tool or a tool system may include circuitry that can apply such an equation to values such as formation dielectric constant and graphitic carbon to kerogen ratio, which may be determined at least in part from tool measurements. As an example, a log may be rendered to a display in real time as a tool is conveyed in a borehole such that a real time interaction occurs between the tool and the display for characterizing one or more formations zones, etc., of the borehole. As an example, a system at a well site can be operatively coupled to a tool to render such a real time log (see, e.g., FIG. 17 and an example kerogen maturity log 1754).

As an example, core vitrinite reflectance can be plotted versus dielectric as measured in vertical wells in a formation with high dielectric, where average resistivity and average dielectric can be determined. In such an example, a method can take average dielectric and look to average Ro to generate a crossplot.

Figure 11:
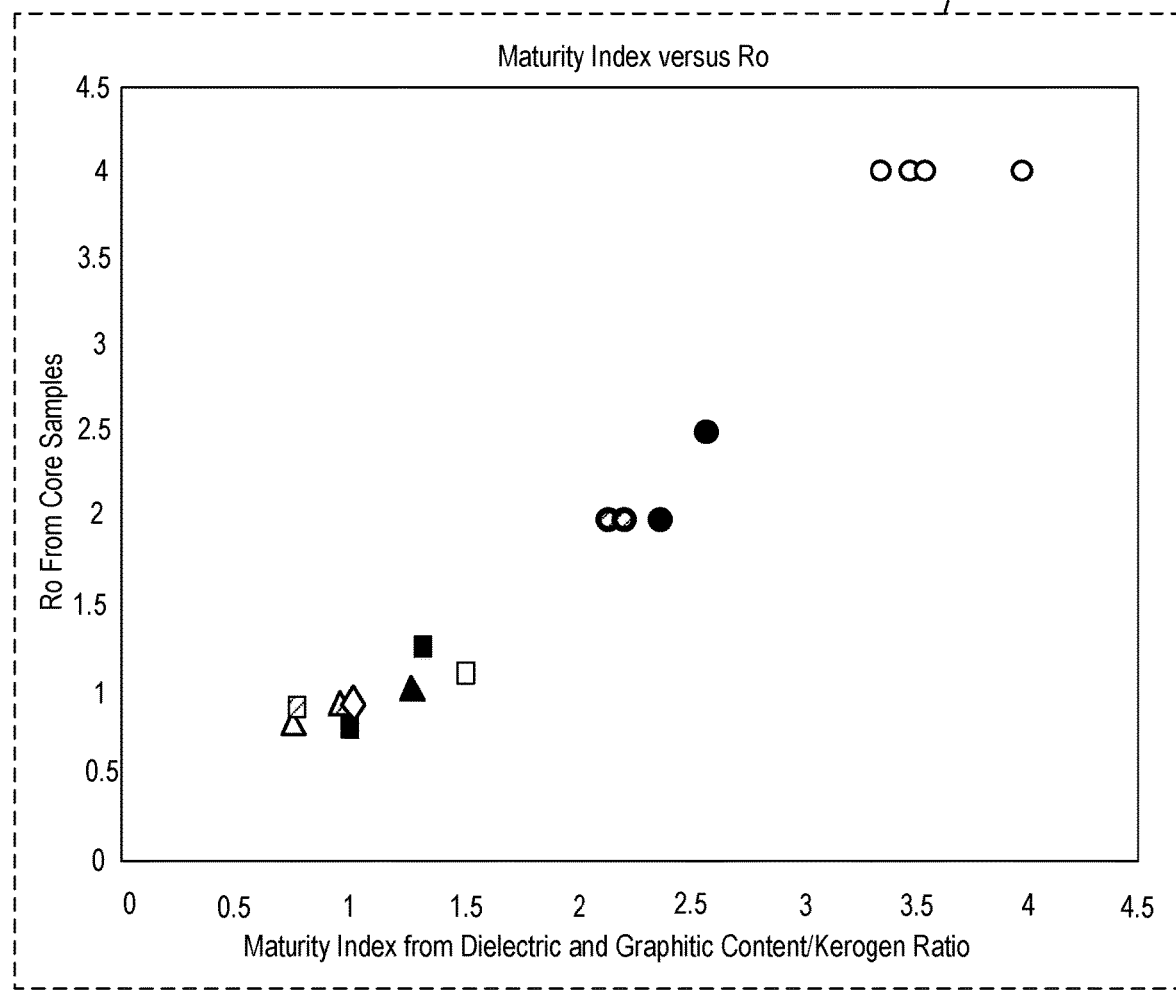
FIG. 11 illustrates an example of a graphical user interface.

FIG. 11 shows an example GUI 1100 rendered to a display 1101, where the GUI 1100 includes measured or known Ro values in organic mudrocks on Y-axis plotted versus computed Ro values for logs using the aforementioned Ro equation that depends on dielectric and graphitic carbon/kerogen ratio. Specifically, FIG. 11 shows a crossplot of results showing positive correlation of formation dielectric constant and graphitic carbon/immature kerogen ratios for low and high maturity organic mudrock zones. The GUI

1100 of FIG. 11 demonstrates the accuracy and applicability of an example method that can predict core-based Ro values. In FIG. 11, each of the points is from a corresponding one of a plurality of wells (e.g., at least approximately 50 feet). As shown, a relatively linear relationship exists in the GUI 1100.

As mentioned, Ro is considered a standard in various industries, such as the coal industry. As shown in FIG. 11, Ro for one or more locations in a well can be determined from logging in the well to determine dielectric properties, without having to perform core sampling and core analysis for the well.

As to graphitic carbon content to kerogen ratio, such a ratio can be defined, for example, as a volume ratio or, for example, a volume fraction. For example, a volume fraction can be determined from dielectric properties as determined from induction measurements.

As mentioned, particle properties can affect resonance. As an example, a tool can include an adjustable frequency generator such that a transmitter coil can emit one or more frequencies where, for example, a scan can be performed to determine a resonant frequency or resonant frequencies for a portion or portions of a formation (e.g., along a borehole) where such frequency or frequencies can be utilized to acquire induction data where that induction data can be utilized to determine dielectric properties. As an example, a tool can include frequency scanner circuitry that can determine one or more resonant frequencies where the tool may automatically perform induction measurements using one or more of those one or more frequencies.

As an example, a tool may make induction measurements for determining anisotropic dielectric properties. Such dielectric properties may be tensor properties. As an example, anisotropy may be due to orientation of particles such as graphitic carbon particles in a formation. For example, consider disc shaped particles, which may be characterized by a shape factor where they may have a planar shape that can have an axis normal to a plane of the planar shape where the orientation of the axis with respect to a tool in a borehole can give rise to anisotropy in induction measurements.

As an example, output from a tool may be utilized to characterize wettability such as wettability of kerogen. As an example, a method can utilize wettability of kerogen to determine one or more parameters of a stimulation operation to stimulate production from a formation. For example, a surfactant utilized in a hydraulic fracturing fluid may be selected based at least in part on wettability as determined via induction measurements. As an example, smectite and illite clays may be differentiated via induction measurements and a proper fracturing fluid mixture selected based on such induction measurements. As a surfactant is both hydrophilic and hydrophobic, wettability of kerogen can be a factor in surfactant selection. For example, if kerogen is hydrocarbon wet or water wet, a fracturing fluid may be tailored based on such a characterization.

As an example, a plot can be made between wettability versus dielectric, as may be determined via induction measurements. As an example, a logging operation can include acquiring induction measurements in a borehole in a formation, determining dielectric properties for the formation and determining wettability of the formation (e.g., kerogen therein, etc.) based on the dielectric properties.

As to a physical relationship between kerogen (e.g., a kerogen maturity index) and one or more dielectric properties, as mentioned, kerogen can mature through application of heat and pressure with respect to time in a manner that converts some of the volume of kerogen to graphitic carbon and expoused hydrocarbon, where the graphitic carbon content can be proportional to vitrinite reflectance.

Revil et al., Induced polarization response of porous media with metallic particles—Part 5: Influence of the background polarization, Geophysics, Vol. 82, No. 2 (March-April 2017); pp. E77-E96 (10.1190/GE02016-0388.1), which is incorporated by reference herein, provides a Cole-Cole model that may be utilized in one or more methods for purposes of characterizing a formation using induction measurements as acquired via a downhole induction tool and/or laboratory tool.

A Cole-Cole model can be utilized that provides a relationship between the induction effective conductivity and permittivity for a formation with particles (e.g., inclusions), akin to that for a clean "host" sand with metallic inclusions of Revil Part 5, as follows:

$$K_{eff} = \sigma_{eff} + i\omega\varepsilon_{eff} = \sigma_\infty\left(1 - \frac{M}{1 + (i\omega\tau_0)^{c_c}}\right)$$

where for the host material:

$$\sigma_\infty = \sigma_t(1+3\varphi_m)$$

where $\varphi_m$ is the inclusion volume fraction, $\sigma_t = \sigma_w \phi_{sd}^{1.3}$, and the chargeability is $$M \approx \frac{9}{2}\varphi_m.$$

The foregoing equation provides for a relaxation time given by $\tau_0$, which can be defined as $$\frac{a^2}{D},$$

where D is dispersion and $\alpha$ is the particle radius. Further, the Cole-Cole exponent can be in the range of Cole-Cole exponent, $c_c$, values between 0 and 1, inclusive thereof. In the foregoing Cole-Cole model, the relaxation time is related to the grain radius and a diffusion coefficient of the charge carriers inside the semiconductor. If the particle size distribution of inclusions is expected to be relatively narrow, the Cole-Cole exponent is expected to be relatively high (e.g., 0.8 to 0.9). As to the parameter M, it is equal to $1-\sigma_0/\sigma_\infty$ and denotes the total chargeability of the mixture (e.g., formation) and $\sigma_0$ and $\sigma_\infty$ represent the direct current (DC) asymptotic in-phase conductivity and the high-frequency asymptotic limit of the in-phase conductivity of the mixture, respectively.

Revil Part 5 also provides an equation for phase $\varphi$ in terms of volume fraction and weight fraction, as follows:

$$\varphi \approx \frac{9}{4}\varphi_m + \varphi_b \approx \frac{9}{4}\frac{\rho}{\rho_m}\varphi_w + \varphi_b$$

where the subscript m is for volume, the subscript w is for weight, and the subscript b is for the phase (in rad) of the background material and where density $\rho$ is for the background material without the inclusions and density $\rho_m$ is that of the inclusions.

The foregoing Cole-Cole model assumes a unimodal grainsize distribution of the particles. As discussed herein, a model can account for factors such as shape, size and/or orientation.

The foregoing equations may be made more explicit for $\varphi_m$ by expanding the complex conductivity in "metallic" volume fraction:

$$K_{eff} = \sigma_{eff} + i\omega\varepsilon_{eff} = \sigma_t(1 + 3\varphi_m)\left(1 - \frac{9}{2x}\varphi_m\right)$$

where $x=1+(i\omega\tau_0)^{c_c}$, or $$\frac{K_{eff}}{\sigma_t} = (1 + 3\varphi_m)\left(1 - \frac{9}{2x}\varphi_m\right) = 1 + \left(3 - \frac{9}{2x}\right)\varphi_m - \frac{27}{2x}\varphi_m^2$$

where a solution may be written as follows:

$$\varphi_m = \frac{-\left(3 - \frac{9}{2x}\right) \pm \sqrt{\left(3 - \frac{9}{2x}\right) + 4\left(1 - \frac{K_{eff}}{\sigma_t}\right)\frac{27}{2x}}}{2\left(1 - \frac{K_{eff}}{\sigma_t}\right)}$$

In the foregoing equations, as graphite (e.g., graphitic carbon particles as inclusion) volume fraction increases, the dielectric constant increases, which, as explained, can be proportional to kerogen maturity. Also note that that as $\sigma_t$ increases or as $R_t=1/\sigma_t$ decreases the effective dielectric constant will also increase. Such a phenomenon is observed in core measurements.

As explained with respect to FIG. 10, a relationship can be established between formation dielectric constant (e.g., one or more dielectric properties) and graphitic carbon content to kerogen ratio, which may be expressed, for example, as a volume fraction or another type of fraction or ratio (e.g., consider mass fraction). In such an example, where formation dielectric constant is determined from induction measurements as acquired using an induction tool in a borehole of a formation, the graphitic carbon content to kerogen ratio or volume fraction of graphitic carbon content can be determined. In the example of FIG. 10, a line or other fit equation may be utilized to make such a determination where, given a value for a formation dielectric constant, a value for graphitic carbon content to kerogen ratio may be determined. As shown in FIG. 10, a low maturity kerogen can be of a lower ratio than an over-mature kerogen.

As explained above, a model may be utilized such as a Cole-Cole model for determining a volume fraction or ratio of graphitic carbon content to kerogen where the graphitic carbon content is considered to be particulate matter that is present as inclusions in the kerogen (e.g., while being part of the kerogen). As an example, one or more techniques may be utilized to determine an amount, a fraction, etc., of graphitic carbon content in a formation through use of induction measurements of the formation. As mentioned, inversion may be performed to determine one or more dielectric property values from induction measurements. In turn, a graphical approach, a database approach and/or a model approach may be utilized to determine a graphitic carbon content parameter from the one or more dielectric property values. As explained, one or more other characteristics of a formation, including particle characteristics, may be determined from such a graphitic carbon content parameter.

As explained, volume fraction (e.g., or volume ratio) and/or mass fraction (e.g., or mass ratio) may be determined from dielectric properties where such dielectric properties may be determined from induction measurements, for example, as acquired using an induction tool in a borehole of a formation. As explained with respect to FIG. 11, a relationship between Ro and maturity index can be represented by a line or other fitting equation where Ro increases with maturity index (or vice versa).

Figure 12:
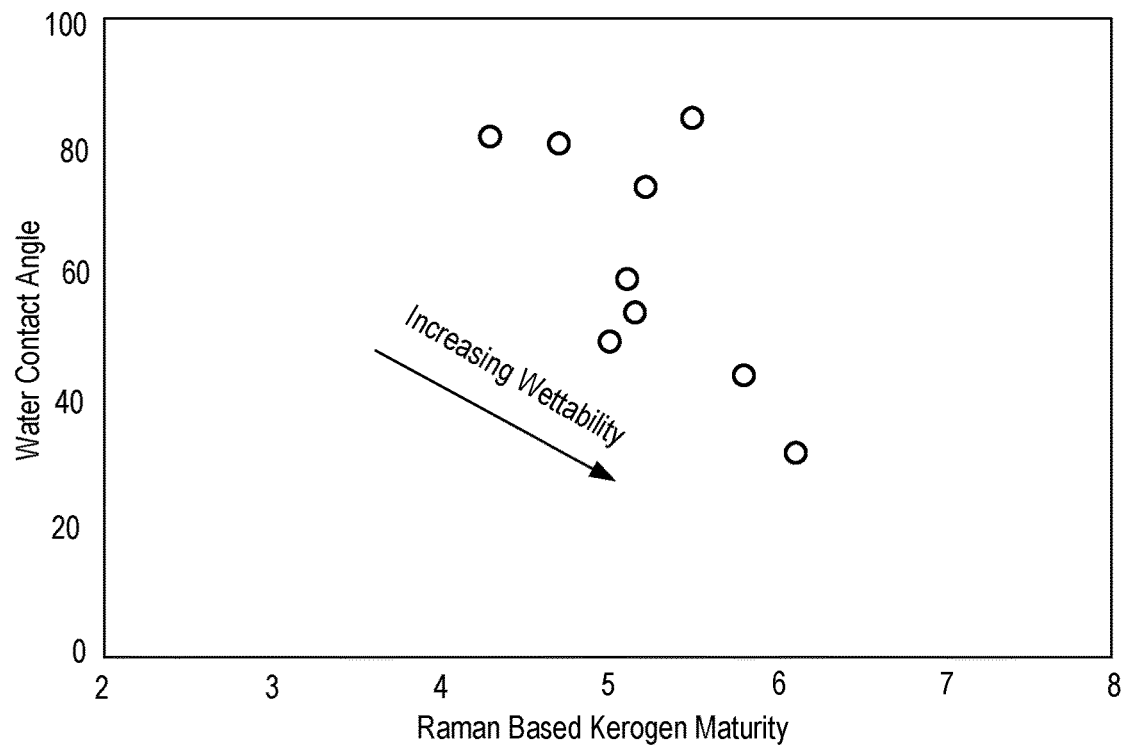
FIG. 12 illustrates an example of a graphical user interface.

FIG. 12 shows an example GUI 1200 rendered to a display 1201 where the GUI 1200 includes water contact angle in degrees (e.g., wettability) versus Raman based kerogen Ro values for organic mudrocks. As shown in FIG. 12, the material (mudrock) becomes more water wet as kerogen maturity increases (see, e.g., arrow that represents a general, approximately trend). Graphitic carbon surfaces can be intrinsically mildly hydrophilic; however, in some instances surface interactions with one or more chemicals may alter the hydrophilic/hydrophobic characteristics and, hence, water-graphitic carbon interactions. As an example, trends may be determined from core samples and/or other samples as to wettability (e.g., via contact angle measurements, etc.) where one or more of such trends may be utilized in generating a log such as a wettability log using downhole induction tool measurements, for example, as inverted for dielectric properties that can be related to graphitic carbon content of kerogen, which may be presented as one or more logs (e.g., a kerogen maturity index log, a wettability log, a graphitic carbon content log, etc.).

As an example, a method can include determining wettability of a formation using a kerogen maturity parameter that is based at least in part on inversion of induction measurements. For example, the information included in FIG. 12 may be utilized where, given a kerogen maturity parameter value, a water contact angle can be determined as an indicator of wettability. In various examples, graphitic carbon material can be water-wet graphitic carbon material.

Contact angle data can be utilized from a plurality of borehole (e.g., via samples, measurements, etc.) to quantify relationships of kerogen wettability with the kerogen maturity. Kerogen maturity tends to relate to wettability of organic kerogen pores with respect to surface character and distribution of polar molecules. As an example, kerogen may be hydrocarbon wet at low maturity, neutral wet at intermediate maturities or hydrophilic for organic surfaces of very high maturities.

As mentioned, one or more trends as to wettability may be established, for example, with respect to materials in a formation, formations, etc. As an example, a field (e.g., a basin) with a number of boreholes can be analyzed via core samples as to wettability. In such an example, data may be plotted or otherwise analyzed to establish a relationship or relationships (see, e.g., FIG. 12). Such a relationship or relationships may be utilized by an induction tool system to output one or more wettability logs, which may be generated in real time as an induction tool or induction tools of the induction tool system are positioned in one or more boreholes (see, e.g., logging operations of FIG. 5). Such log or logs may be rendered to a display in a manner that is responsive to position of an induction tool or induction tools such that as rendering occurs responsive to movement (e.g., position with respect to time) of the induction tool or induction tools. In such an example, the log or logs are dynamic (e.g., dynamically rendered to a display or displays). While such dynamic logs are described as to wettability, various other logs may be dynamic logs (e.g., kerogen maturity index, graphitic carbon content (e.g., volume, fraction, weight, etc.), clay content, graphitic carbon character (e.g., size, shape, orientation, etc.), formation anisotropy with respect to graphitic carbon structures, etc.).

As mentioned, dielectric permittivity can be large, on the order of 10,000 to 100,000,000 when certain clays and metallic particles are present in a formation where the particles are of certain size, shape and percent volume (e.g., or weight). As an example, in formations that include kerogen, dielectric permittivity can be in various regions of the order of 100,000, which can be an indication that graphitic carbon structures in the kerogen are brine wet (e.g., water containing more dissolved inorganic salt than seawater).

As mentioned, wettability and kerogen maturity can be related and one or both may be determined from induction measurements and, for example, rendered as a log or logs, which can be dynamic (e.g., real time, responsive to positioning of an induction tool in a borehole, etc.). As an example, a method can include making determinations as to production, which may be rendered as a production log. For example, hydrocarbon wet as corresponding to a low water wettability and/or a low kerogen maturity index can indicate wet gas production, intermediate wet as corresponding to an intermediate water wettability and/or an intermediate kerogen maturity index can indicate dry gas production, and water wet as corresponding to a higher wettability and/or a higher kerogen maturity index can indicate a lower probability of gas production. As an example, one or more field operations can be performed to on one or more selected regions using a log or logs, which can include one or more of wettability, kerogen maturity index, graphitic carbon content, gas production, etc., as based at least in part on inversion of induction measurements from an induction tool where the inversion provides dielectric properties that underlie generation of such a log or logs.

As mentioned, an induction tool system can include circuitry that is specialized to generate one or more of such logs in such a manner. Such circuitry can include specialized instructions stored in memory of a memory device that are executable by one or more processors to generate one or more logs, which may be stored in memory of a memory device, transmitted via one or more communication interfaces (e.g., wired and/or wireless), rendered to a display, rendered via a printer to a medium such as paper, etc. As an example, an induction tool system may be operatively coupled to one or more control systems that can control field equipment to perform one or more field operations using a generated log or logs. As mentioned, stimulation may be performed based on a log or logs, drilling may be performed based on a log or logs (e.g., from one or more offset boreholes/wells, etc.), etc.

Figure 13:
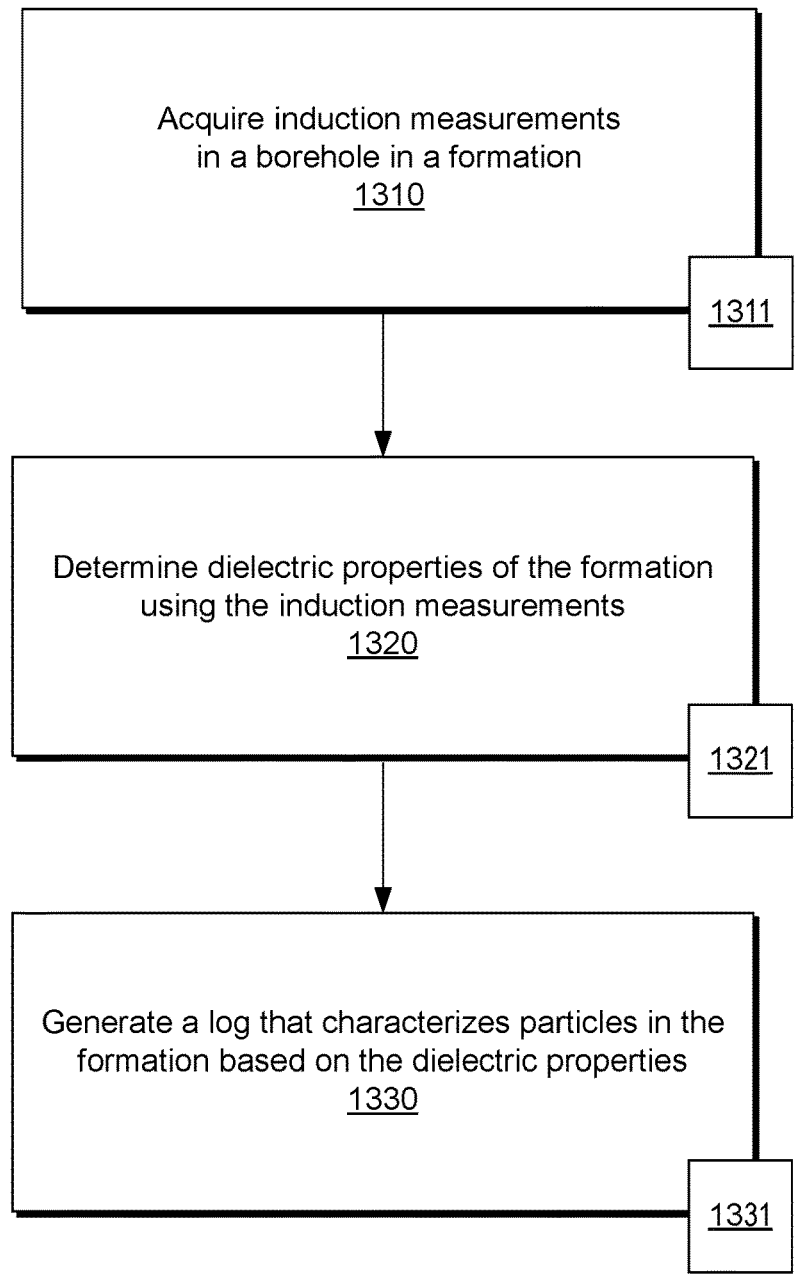
FIG. 13 illustrates an example of a method.

FIG. 13 shows an example of a method 1300 that includes an acquisition block 1310 for acquiring induction measurements in a borehole in a formation, a determination block 1320 for determining dielectric properties of the formation using the induction measurements, and a generation block 1330 for generating a log that characterizes particles in the formation based on the dielectric properties. Such a log may be a dynamic log, for example, consider a dynamic log that is rendered to a display responsive to positioning of the induction tool in the borehole. As an example, the method 1300 can include acquiring induction measurements dynamically while conveying the induction tool in the borehole and where the log is a dynamic log that includes a depth measure (e.g., a position measure) and a log measure where the depth measure corresponds to position of the induction tool and where the log measure is based at least in part on at least one characteristic of the particles as present in the formation at the position of the induction tool. In such an example, a log can be composed of multiple log measures versus multiple position measures (e.g., depth measures, etc.). As an example, a log or logs can be for logging-in and/or for logging-out (e.g., depending on direction of an induction tool).

The method 1300 is shown in FIG. 13 in association with various computer-readable media (CRM) blocks 1311, 1321 and 1331 (e.g., non-transitory media that are not carrier waves and that are not signals). Such blocks generally include instructions suitable for execution by one or more processors (or cores) to instruct a computing device or system to perform one or more actions. While various blocks are shown, a single medium may be configured with instructions to allow for, at least in part, performance of various actions of the method 1300. As an example, a computer-readable storage medium (CRM) is a non-transitory computer-readable storage medium that is not a carrier wave and that is not a signal. One or more CRM blocks may be provided for graphical user interfaces (GUIs), etc. One or more CRM blocks may be provided for rendering information to a display, etc. (e.g., consider rendering a model to a display, etc.).

Figure 14:
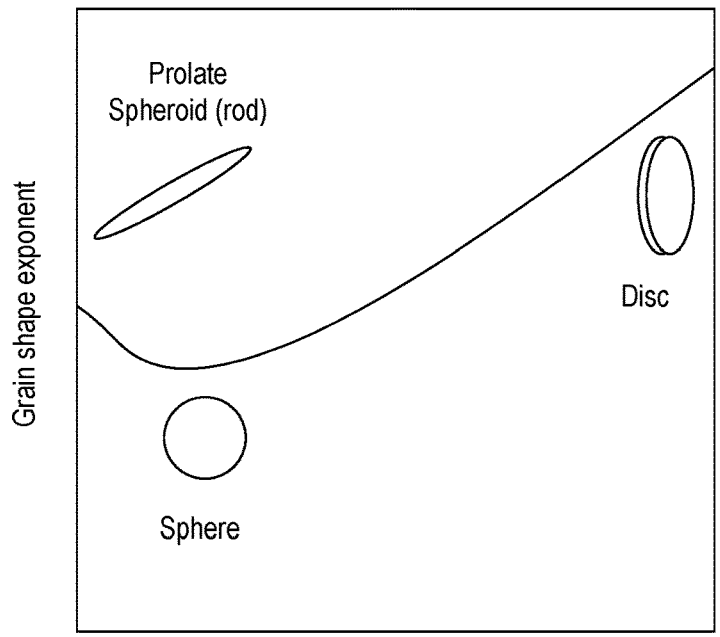
FIG. 14 illustrates examples of plots.
Figure 14:
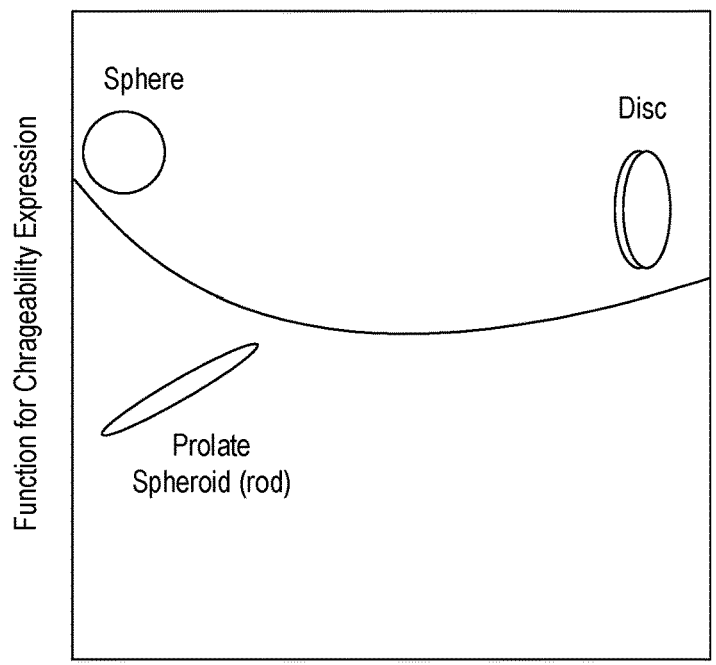

FIG. 14 shows example plots 1410 and 1430 as to particle shapes, as described in Revil et al., Induced polarization response of porous media with metallic particles—Part 1: A theory for disseminated semiconductors, Geophysics, Vol. 80, No. 5 (September-October 2015); pp. D525-D538 (10.1190/GE02014-0577.1), which is incorporated by reference herein ("Revil Part 1"). Revil Part 1 described a model regarding polarization of dispersed metallic conductors (e.g., pyrite and magnetite) in porous media free of redox-active ionic species in the pore water. Revil Part 1 found that, in the presence of a polarizable background (e.g., a clayey matrix), total chargeability of the material can be determined from the chargeability of the metallic particles and the chargeability of the background material.

In FIG. 14, the plot 1410 shows the relationship between the grain shape exponent and the eccentricity of the metallic particles. The grain shape exponent affects the chargeability according to a function where that function tends to depend weakly on the grain shape exponent, as shown in the plot 1430. In Revil Part 1, the value is close to the theoretical value for spherical particles. Total chargeability was found to vary with concentration of metallic particles. Again, in Revil Par 1, for spheroidal particles, the grain shape was shown to have a minor effect on the result, which held as long as the eccentricity of the metallic grains is smaller than 10 and the orientation of the grains is randomly distributed.

As may be appreciated, in kerogen, for various reasons, eccentricity of graphitic carbon particles can be greater than 10 and the orientation of the graphitic carbon particles may not be randomly distributed. As mentioned, factors such as strain can orient particles such as graphitic carbon particles preferentially, which may be related to one or more processes that form such particles (e.g., temperature, pressure and/or strain).

As an example, a method can include modeling kerogen with different particles and/or particle orientations. In such a method, induction measurements can be analyzed with respect to modeling results. Such an approach can characterize one or more aspects of particles in kerogen. As an example, induction measurements acquired via one or more induction tools can be analyzed directionally with respect to a model or models, which can, for example, generate results as to anisotropy of a formation. As an example, for a formation, where a number of boreholes are available for performing induction measurements and/or where a borehole changes angle relative to an orientation of a formation (e.g., dipping, etc.), such measurements can be analyzed for one or more purposes, which can include one or more of determining anisotropy, particle shape, particle orientation, particle volume fraction, particle concentration, etc.

As mentioned, dielectric properties of a formation can be anisotropic due to nature of rock and/or nature of particles within the rock. As an example, x, y and z induction measurements may be made and/or cross-coordinate induction measurements (e.g., xy, etc.). In various trials, dielectric properties differed in a manner responsive to formation anisotropy. As mentioned, a dielectric tensor can be defined with various values that represent anisotropy. In measurements of synthetic cores, determined dielectric properties in x and z differed; whereas, in x and y, the dielectric properties were approximately the same (e.g., $\sigma_x$ was not equal to $\sigma_z$ and $\sigma_x$ was approximately the same as $\sigma_y$). Such anisotropy can be due at least in part to how synthetic cores are formed (e.g., settling of particles, etc.), including orientation with respect to gravity.

As an example, models and synthetic cores can be utilized to generate a database where the database can be utilized in combination with induction measurements from one or more downhole tools to compare such induction measurements for outputting one or more types of logs that characterize a formation or formations (e.g., with respect to particles therein, etc.). As explained, graphite is known to exist in roughly two-dimensional forms with thicknesses that are substantially less than planar dimensions. As explained, formation process(es) can effect various characteristics of graphitic properties of particles, which can include size, shape, concentration, orientation, etc.

Figure 15:
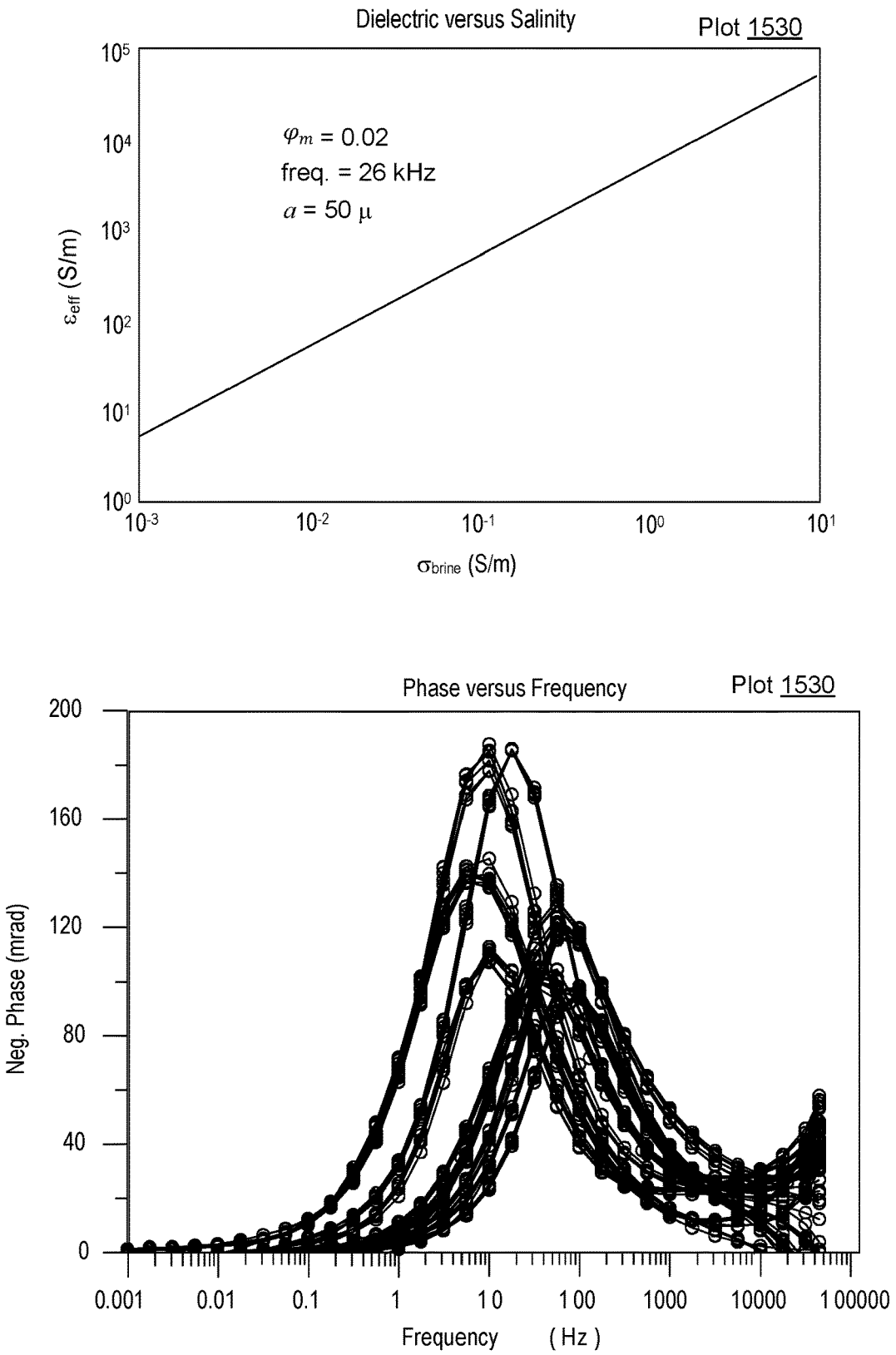
FIG. 15 illustrates an example of a plot.

FIG. 15 shows an example of a plot 1500 of phase versus frequency for different mixture compositions where frequency ranges from approximately 0.01 Hz to approximately 100 kHz. The mixtures and values are those of Revil Part 5 for sand, clay and pyrite. Specifically, in the plot 1500 of FIG. 15, the data are an unadjusted data set for the spectral induced polarization spectra of the sand-clay mixtures with pyrite (volume fraction of pyrite 5.8 percent). The Cole-Cole exponent, characterizing the particle size distribution of the pyrite grains, was shown as being independent of the clay content. While, in the presence of pyrite, the magnitude of the phase peak and the phase peak frequency depend on the clay content in a manner not explained by the Cole-Cole model of Revil Part 5; noting that the Cole-Cole relaxation time, in the presence of pyrite, is inversely proportional to the conductivity of the background material.

Figure 16:
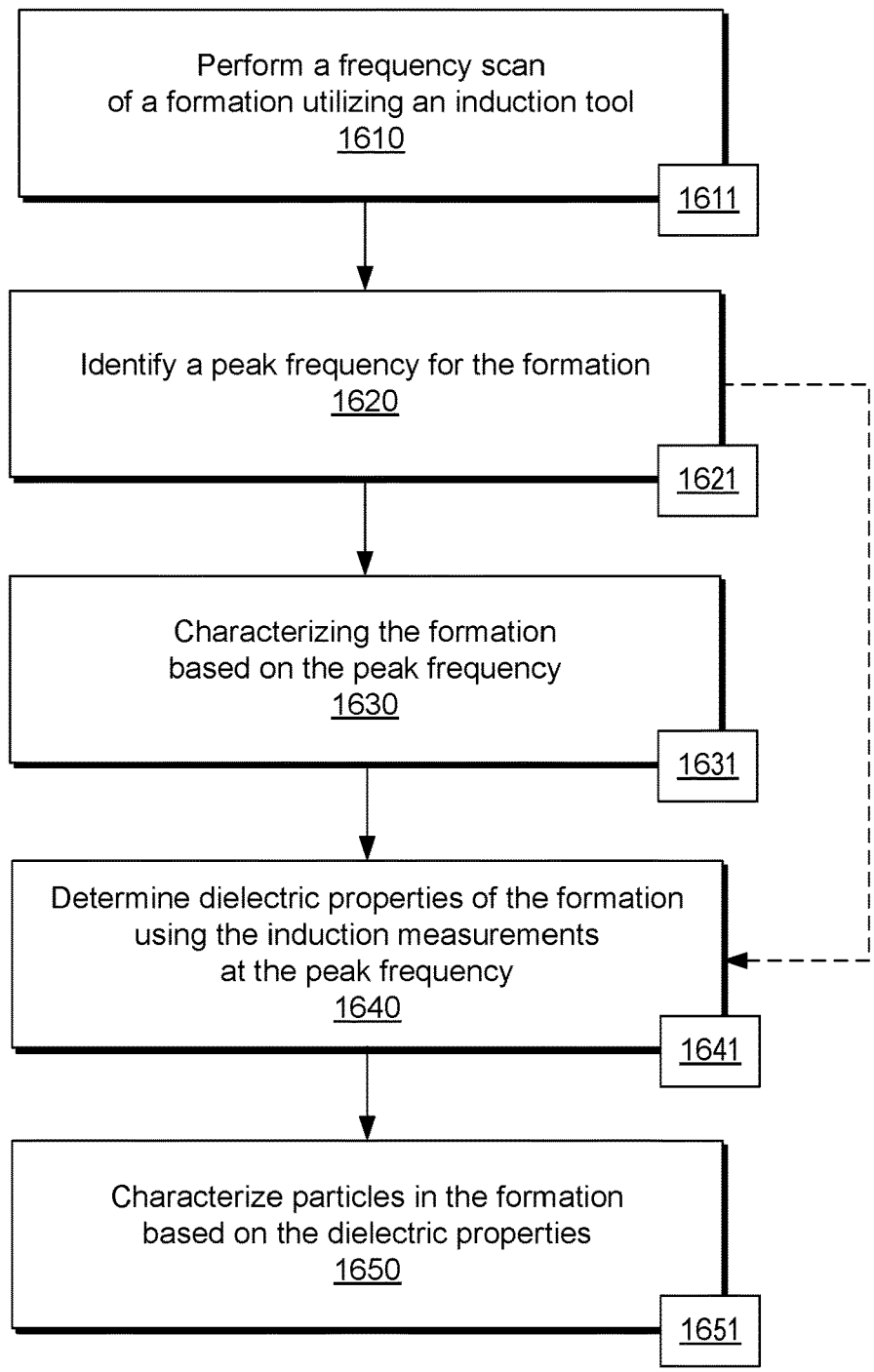
FIG. 16 illustrates an example of a method.

FIG. 16 shows an example of a method 1600 that includes an performance block 1610 for performing a frequency scan of a formation utilizing an induction tool in a borehole of the formation, an identification block 1620 for identifying a peak frequency for the formation based on the frequency scan (e.g., peak phase, etc.), a characterization block 1630 for characterizing the formation based on the peak frequency, a determination block 1640 for determining dielectric properties of the formation using the induction measurements at the peak frequency, and a characterization block 1650 for characterizing particles in the formation based on the dielectric properties. As shown in FIG. 16, a method may optionally proceed from the block 1620 to the block 1640 without the block 1630. As an example, the block 1630 may be performed in conjunction with the block 1650.

The method 1600 is shown in FIG. 16 in association with various computer-readable media (CRM) blocks 1611, 1621, 1631, 1641 and 1651 (e.g., non-transitory media that are not carrier waves and that are not signals). Such blocks generally include instructions suitable for execution by one or more processors (or cores) to instruct a computing device or system to perform one or more actions. While various blocks are shown, a single medium may be configured with instructions to allow for, at least in part, performance of various actions of the method 1600. As an example, a computer-readable storage medium (CRM) is a non-transitory computer-readable storage medium that is not a carrier wave and that is not a signal. One or more CRM blocks may be provided for graphical user interfaces (GUIs), etc. One or more CRM blocks may be provided for rendering information to a display, etc. (e.g., consider rendering a model to a display, etc.).

Figure 17:
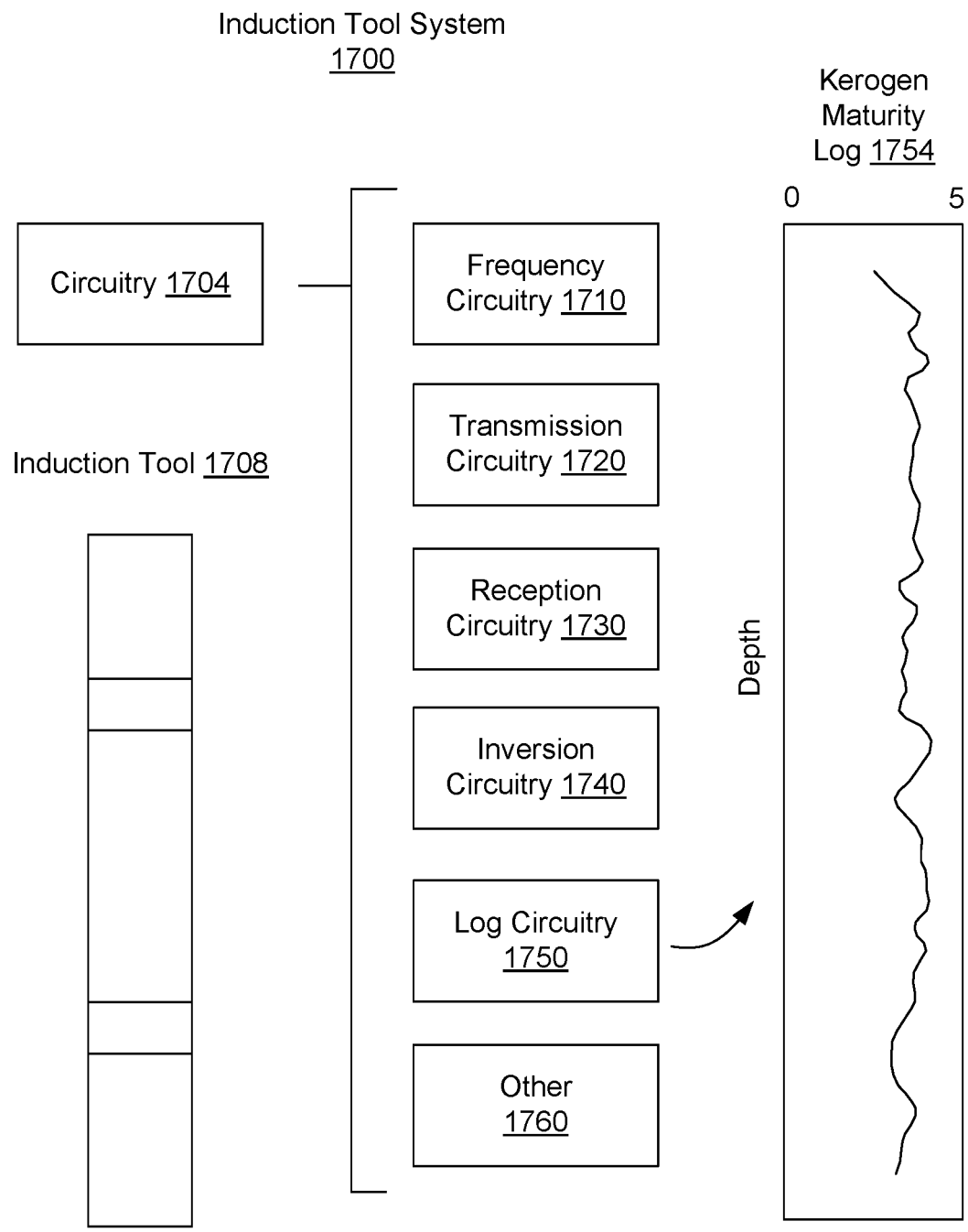
FIG. 17 illustrates an example of a system and an example of a log.

FIG. 17 shows an example of an induction tool system 1700 as a formation characterization system that includes circuitry 1704 and an induction tool 1708 where one or more portions of the circuitry 1704 may be disposed within the induction tool 1708 and/or otherwise operatively coupled to the induction tool 1708 to receive data that are induction measurements and/or other data therefrom. The induction tool 1708 can include various coils, for example, as explained with respect to the system 400 of FIG. 4. As shown, the circuitry 1704 can include frequency circuitry 1710, transmission circuitry 1720, reception circuitry 1730, inversion circuitry 1740, log circuitry 1750 and one or more other components 1760. As an example, the frequency circuitry 1710 can generate transmissions for the transmission circuitry 1720 to cover a range of frequencies, which can be selected based on one or more formation characteristics, which can include expected graphitic carbon particle size as a formation characteristic. For example, a formation may be expected to include graphitic carbon particles within a range of particle size such that a range of frequencies can be utilized for transmissions of energy into the formation where a peak frequency or peak frequencies may be detected (see, e.g., the method 1600 of FIG. 16). As an example, an upper range of the frequency circuitry 1710 may be of the order of megahertz (MHz) and a lower range of the frequency circuitry 1710 may be of the order of hertz (Hz).

As an example, the transmission circuitry 1720 can be operatively coupled to a coil or coils and/or include a coil or coils. As an example, the reception circuitry 1730 can be operatively coupled to a coil or coils and/or include a coil or coils. As an example, the inversion circuitry 1740 can optionally include one or more processors and memory that stores processor-executable instructions to invert induction measurements to output dielectric properties. As an example, the log circuitry 1750 can be operatively coupled to the inversion circuitry 1740 to generate one or more logs that correspond to locations of a formation where the induction tool 1708 has acquired induction measurements. As an example, the system 1700 may include one or more processors, which can be part of one or more circuitries. The induction tool system 1700, which can be a formation characterization system, can include one or more processors, memory accessible to at least one of the one or more processors and instructions stored in the memory that are executable to instruct the system to perform a method such as, for example, the method 1300 of FIG. 13 and/or one or more other methods.

As shown, the induction tool system 1700 can generate a kerogen maturity log 1754, which is shown in FIG. 17 as a log of kerogen maturity values (e.g., from 0 to 5) with respect to depth (e.g., measured depth, true vertical depth, etc.). As an example, such a log may be rendered to a display with one or more other logs such as, for example, one or more of the logs of the GUI 600, the GUI 700, etc. As an example, a graphical user interface (GUI) can include one or more logs as graphics, which may be color coded or otherwise coded. As mentioned with respect to the GUI 700, different zones may be identified using one or more logs. Again, in the GUI 700, the Rv and Rh measurements adjust for dipping shale beds in the zone A and, in the zone B, the measurements properly provide for identification of a low resistivity pay zone that otherwise may have been overlooked. The zones A and B may be characterized using the system 1700 of FIG. 17 where, for example, a kerogen maturity log may be rendered along with the Rv and Rh logs (and/or one or more other logs). As mentioned, a log may provide for wettability (e.g., contact angle), Ro and/or another measure.

As an example, the one or more other components 1760 can include, for example, one or more interfaces, one or more accelerometers, one or more gyroscopes, one or more inclinometers, one or more gravitometers, one or more power sources, one or more radiation-based sensors (e.g., UV, vis, IR, combinations thereof, etc., which may measurement absorption, etc.), one or more temperature sensors, one or more pressure sensors, one or more moisture sensors, one or more hydrocarbon sensors, etc. As an example, an induction tool can include a dip and azimuth package that includes circuitry for determining dip and/or azimuth.

As an example, a method can include determining kerogen Ro index or kerogen maturity for a formation from inverted formation dielectric property values, which may be determined from induction measurements.

As an example, zz or longitudinal induction measurements can be utilized as induction measurements. As an example, one or more other types of induction measurements may be utilized (e.g., xx, yy, xy, etc.), which can exhibit sensitivity to graphite carbon volumes (e.g., volume fraction or volume ratio of graphitic carbon content to kerogen). As an example, graphitic carbon content may be referred to as a type of mature content of kerogen while such kerogen includes other content that may be referred to as immature content or immature kerogen.

As an example, a method can include determining a ratio of graphitic carbon content (e.g., mature content, particles, inclusions, etc.) to immature kerogen via a correlation with formation dielectric constant and Ro. As an example, one or more functions may be utilized for determining or using graphitic carbon content and immature kerogen volumes. As mentioned, weight may be utilized alternatively or additionally to volume where weight can be wet weight or dry weight. As an example, a formation subjected to induction measurements can include wet graphitic carbon content that is kerogenic content in a matrix of kerogen.

As an example, a method can include using a combination of formation dielectric constant and ratio graphitic carbon/immature kerogen volumes to determine Ro; noting that either one individually may be utilized to determine Ro.

As an example, a method can include determining wettability of kerogen where the wettability (e.g., as determined by contact angle for water) may tend to increase with kerogen maturity in a substantially linear manner (see, e.g., FIG. 12) where, for example, from low maturity, particular kerogen can tend to be hydrocarbon wet while at highest maturity levels, it can tend to become water wet. As mentioned, one or more trends (e.g., equations, plots, datasets, etc.) may be established for wettability using one or more analysis techniques (e.g., contact angle analysis of core samples, synthetic samples, etc.). As to contact angle for water, the contact angle ($\Theta_c$) tends to be at higher angles for non-wetting and lower angles for wetting, for example, as a drop spreads on a substrate, the contact angle decreases.

As an example, a method can include deriving volume fraction of graphitic carbon content of a formation using an induction tool system that acquires induction measurements where the deriving volume fraction is based at least in part on use of an effective medium model (e.g., equation or equations).

As mentioned, a method can include clay typing based on induction tool system induction measurements. As mentioned, a method can determine clay volume (e.g., or clay weight) using information such as frequency (e.g., peak frequency).

One or more systems, methods, etc., may be applied to an unconventional play. A method can include performing one or more operational actions in an unconventional play using one or more logs, which may be dynamic logs (e.g., kerogen maturity index as a function of induction tool position in a borehole, etc.). A play can be defined as an area in which hydrocarbon accumulations or prospects of a given type occur. For example the shale gas plays in North America include the Barnett, Eagle Ford, Fayetteville, Haynesville, Marcellus, and Woodford, among various others. Outside North America, shale gas potential is being pursued in many parts of Europe, Africa, Asia, and South America. The term "unconventional" may refer to a resource or resources such as, for example, containing oil and/or natural gas. The methods by which these unconventional resources are extracted differ from conventional extraction methods. A geologic environment may be characterized, for example, as to one or more of porosity, permeability, fluid trapping mechanism, or other characteristics, which may differ from so-called "conventional" sandstone and carbonate reservoirs. Coalbed methane, gas hydrates, shale gas, shale oil, fractured reservoirs, and tight gas sands may be considered to be unconventional resources (e.g., in an "unconventional" environment, play, etc.).

Figure 18:
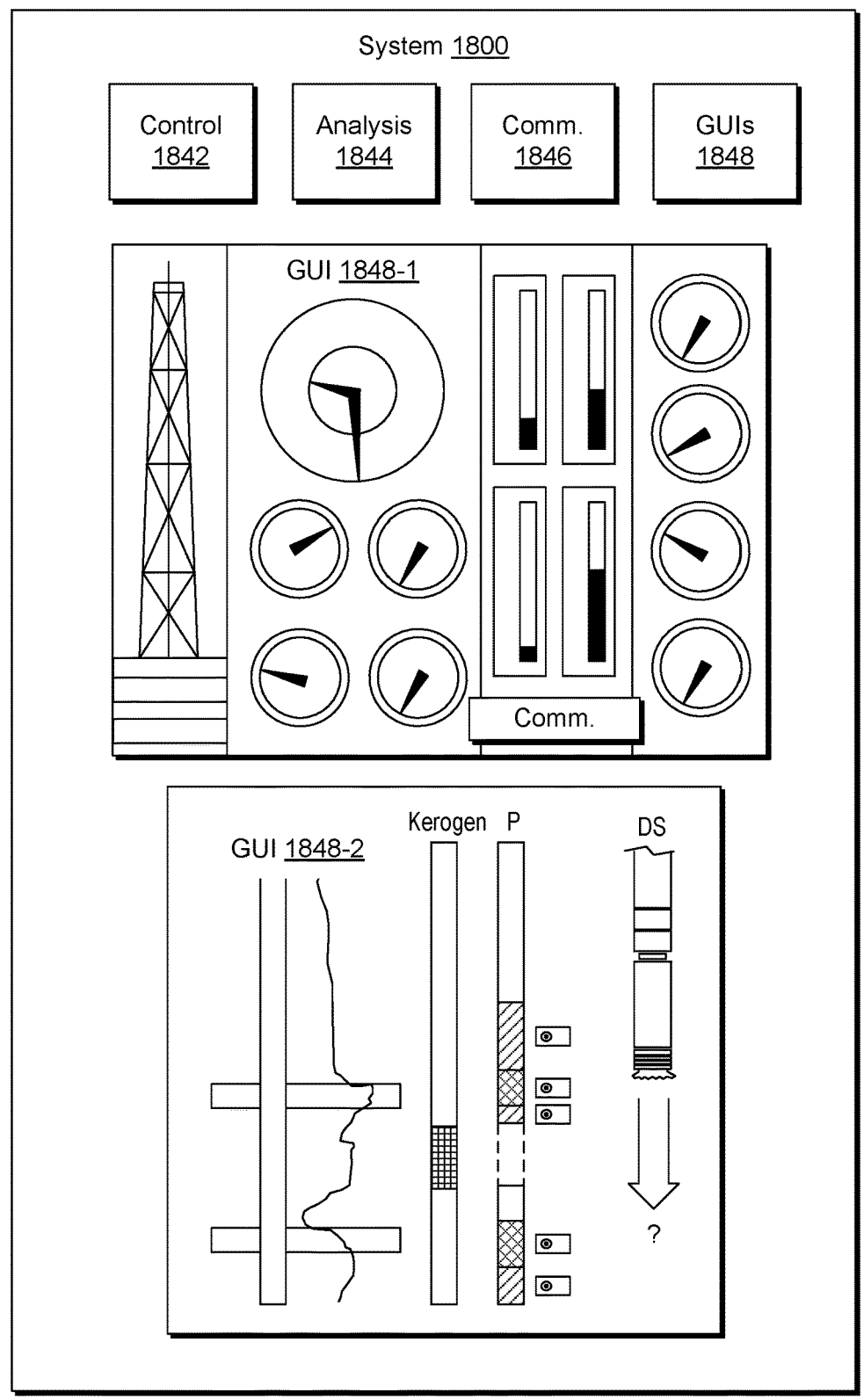
FIG. 18 illustrates an example of a system.

FIG. 18 shows an example of a system 1800 that includes various components such as a control component 1842, an analysis component 1844, a communication component 1846 and one or more graphical user interface components 1848. As an example, the system 1800 may include one or more features of a framework such as, for example, the TECHLOG® framework, the INTERACT® framework, etc. As an example, a GUI 1848-1 may render information as to real-time conditions at a site (e.g., a well site) and a GUI 1848-2 may render information as to one or more regions within an environment. For example, a region may be a drilled region, a region to be drilled, etc. As shown in the GUI 1848-2, values, which may be index values, may be rendered with respect to a spatial dimension such as depth. Such values may indicate lithology of a region, for example, consider a region with kerogen where the values can be kerogen maturity values (e.g., kerogen maturity index values). In such an example, equipment may be controlled to account for one or more operations for the region. As mentioned, a region may be subjected to fracturing via hydraulic fluid that is introduced to a borehole to contact the region and generate one or more fractures. Such fluid can be tailored to the region based at least in part on one or more kerogen maturity values. For example, consider a relationship between maturity and wettability or hydrophilicity/hydrophobicity where a surfactant or surfactants may be selected for inclusion in the fluid (e.g., type, concentration, etc.).

As an example, various values may indicate lithology of a region, for example, consider a kerogen deposit. As an example, the GUI 1848-2 may include one or more of a kerogen deposit graphic, an operational parameter(s) graphic (P) and a drill string (DS) graphic. In such an example, equipment (e.g., drillstring equipment) may be controlled to account for drilling into a kerogen deposit, etc.

As an example, information rendered to a display can include zone information. For example, consider the zone information of FIG. 18 being rendered in a format where one or more characteristics of rock may be visually discernable. As an example, a GUI can include an anisotropy track, a Musc/Orth track, a diagenetic track, a porosity track, kerogen maturity track, a clay track, a wettability track, a gas production track, etc. As an example, one or more tracks may be color coded or otherwise scaled and rendered to allow for discernment of various characteristics and differences therebetween (e.g., and/or similarities) for depths in a geologic environment where one or more wells may be planned and/or drilled.

As an example, a geologic environment may be an environment that includes a reservoir or reservoirs. As an example, a geologic environment may be an environment that is a geothermal environment. As an example, a geologic environment may be an environment that is utilized for storage of waste such as, for example, nuclear waste. As an example, a geologic environment may be a non-oil and gas environment (e.g., as may be suitable for production). As an example, a geologic environment may be a hydrologic environment.

As an example, a model may be utilized for one or more completions in a geothermal environment. As an example, in a geothermal environment, a gradient may characterize the rate of increase in temperature per unit depth in the Earth. As an example, a temperature gradient may be associated with a volcanic area or volcanic areas. As an example, information as to igneous deposits may assist with a completion in a geothermal or other geologic environment.

As to nuclear waste (e.g., radioactive waste), it may be a by-product of nuclear power generation or another application of nuclear fission or nuclear technology (e.g., research, medicine, etc.). The time radioactive waste is to be stored can depend on the type of waste and radioactive isotopes. For example, storage may be in a range from a few days for very short-lived isotopes to millions of years. As an example, a segregation and storage for plan may call for near-surface disposal for low and some intermediate level waste and deep burial or partitioning/transmutation for the high-level waste. As an example, a method can include outputting a model that can assist with waste management. For example, a model may characterize risk of flow for a subsurface where waste exists or where waste is to be stored. As an example, a model may facilitate planning as to one or more completions associated with subsurface waste storage.

As an example, a model may be output that can assist with hydrologic analysis of a region. For example, a model may characterize rock with respect to movement, distribution, and/or quality of water, optionally in a region that includes oil, gas, waste, etc. As an example, a model may facilitate planning of one or more completions with respect to hydrology of a region (e.g., consider wettability, etc.). For example, where a region includes one or more layers that may be amenable to washout, a completion may be planned with respect to path and/or construction to address potential risk of washout.

As an example, a method can include acquiring induction measurements in a borehole in a formation using an induction tool; determining dielectric properties of the formation using the induction measurements; and generating a log that characterizes particles in the formation based on the dielectric properties. In such an example, the log can be a dynamic log that is rendered to a display responsive to positioning of the induction tool in the borehole.

As an example, induction measurements can be performed at a frequency that is a resonant frequency of a formation that depends on characteristics of particles.

As an example, particles in a formation can be characterized by mean particles sizes, for example, that can be in excess of approximately 10 microns. As an example, particles can be wet such as, for example, brine wet. As mentioned, brine wet particles in a formation can have a relatively large dielectric permittivity, which may be determined, for example, from inversion of induction measurements as acquired from an induction tool (e.g., a downhole induction tool). As an example, a method can include determining a peak frequency for a formation that includes particles where the peak frequency can be utilized to determine one or more characteristics of the formation (e.g., including the particles). As mentioned, induction tool measurements may be performed at a peak frequency, which may be determined by an induction tool performing a frequency scan and detecting a peak frequency using data acquired during the frequency scan. As mentioned, one or more particle characteristics may be associated with frequency, including a peak frequency. As an example, a log can be a peak frequency log, which may be dynamic in response to an induction tool performing a frequency scan at one or more positions. As an example, a log can be a log that includes log measures that are based at least in part on peak frequency. As an example, a method can include generating logs and rendering such logs to a display where at least one of the logs is based on peak frequency (see, e.g., FIG. 15, noting that such an approach may be utilized for different formation compositions, characteristics, etc.). As an example, a method can include generating logs at a peak frequency where each of the logs presents a different log measure with respect to, for example, a common depth measure (e.g., position measure). For example, consider a peak frequency based log measure and a kerogen maturity index log measure with respect to measured depth in a borehole. Such a method can, for example, determine the kerogen maturity index log measure with respect to induction measurements acquired by an induction tool operating at the peak frequency. Such an approach can, for example, improve signal (e.g., induction measurement quality, etc.), which can be beneficial for an inversion of induction measurements for dielectric property values, which can, in turn, be utilized for generating kerogen maturity index values.

As an example, a method can include one or more of generating a log that characterizes graphitic carbon particles in a formation and generating a log that characterizes maturity of kerogen in a formation, for example, based on content of graphitic carbon particles (e.g., volume, weight, etc.). As an example, a method can include generating a log that characterizes wettability of the particles in the formation.

As an example, a method can include determining dielectric properties by inverting induction measurements as acquired by an induction tool in a borehole.

As an example, a method can include generating a log by characterizing particles utilizing a fitting function that describes a relationship between a particle characteristic and dielectric properties.

As an example, a method can include generating a log by characterizing particles utilizing a fitting function that describes a relationship between a kerogen characteristic and dielectric properties.

As an example, a method can include generating a log by characterizing particles utilizing a fitting function that describes a relationship between a wetting characteristic and dielectric properties.

As an example, a method can include generating a log by characterizing particles utilizing a fitting function that describes a relationship between a clay characteristic and dielectric properties.

As an example, a method can include determining a stimulation operation parameter based on a generated log and performing the stimulation operation.

As an example, a method can include generating a log via at least one of characterizing shape of particles, characterizing size of particles and characterizing orientation of particles.

As an example, induction measurements can include R signal and X signal measurements. As an example, induction measurements can include one or more of zz, xx, yy, and xy (e.g., or other). As an example, induction measurements acquired for different coil pairs can be analyzed to characterize anisotropy, which can, for example, relate to orientation of particles, which can be graphitic carbon particles. For example, as mentioned, physical processes can determine how graphitic carbon particles are oriented in a formation, which can be a formation that includes kerogen. As an example, a method can include determining graphitic carbon as being biotic or abiotic. As mentioned, physical processes such as shearing and/or straining can be involved in formation of graphitic carbon where such physical processes can effect or determine orientation and/or one or more other characteristics (e.g., shape, size, etc.).

As an example, a method can include acquiring induction measurements dynamically while conveying an induction tool in a borehole. In such an example, a dynamic log can be generated via inversion of induction measurements (e.g., optionally acquired at a peak frequency) for dielectric properties where the dynamic log includes a depth measure and a log measure where the depth measure corresponds to position of the induction tool and where the log measure is based at least in part on at least one characteristic of the particles as present in the formation at the position of the induction tool.

As an example, a system can include a processor; memory accessibly by the processor; instructions stored in the memory and executable by the processor to instruct the system to: acquire induction measurements in a borehole in a formation using an induction tool; determine dielectric properties of the formation using the induction measurements; and generate a log that characterizes particles in the formation based on the dielectric properties. In such an example, the system can include the induction tool, where the induction tool can include frequency circuitry and where the instructions can include instructions to instruct the system to determine a peak frequency responsive to a frequency scan of the formation using the frequency circuitry of the induction tool and can include instructions to acquire the induction measurements at the peak frequency, where the peak frequency depends at least in part on at least one characteristic of the particles in the formation.

As an example, one or more computer-readable storage media can include processor-executable instructions where the processor-executable instructions include instructions to instruct a computer to: acquire induction measurements in a borehole in a formation using an induction tool; determine dielectric properties of the formation using the induction measurements; and generate a log that characterizes particles in the formation based on the dielectric properties.

Figure 19:
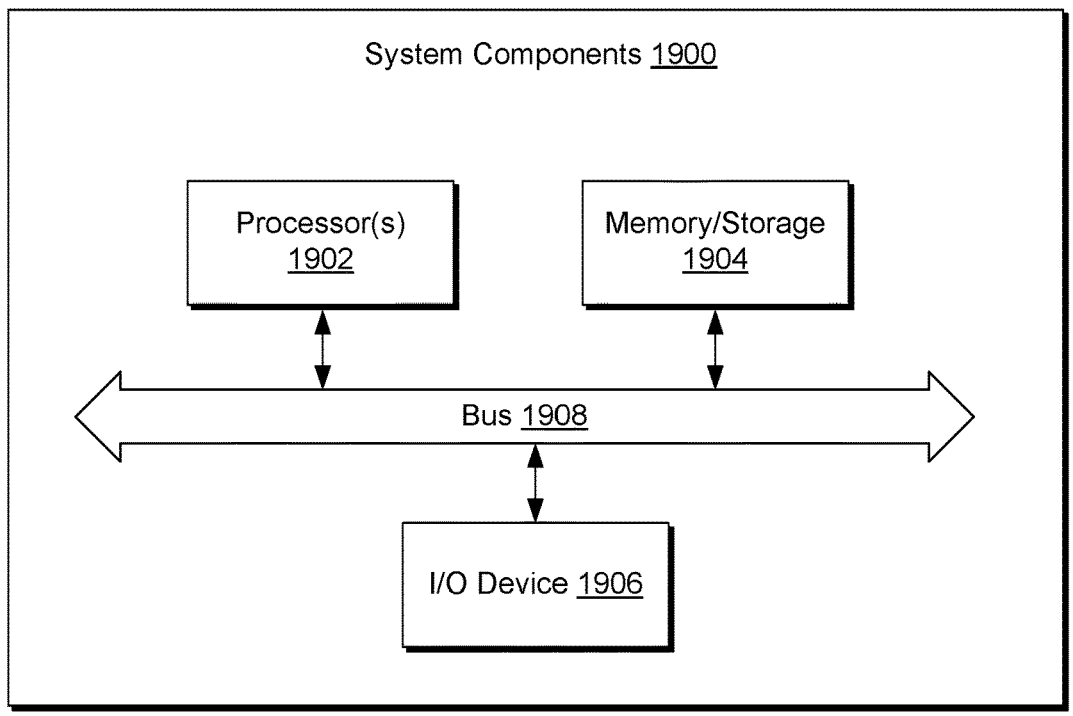
FIG. 19 illustrates example components of a system and a networked system.
Figure 19:
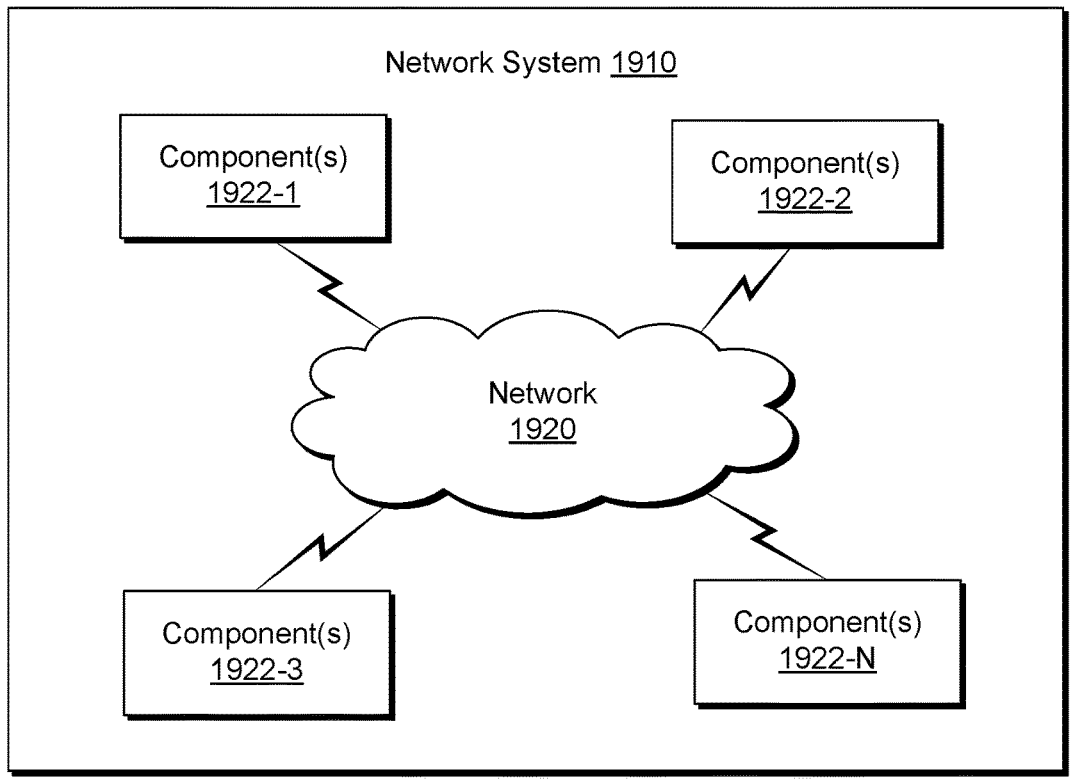

FIG. 19 shows components of an example of a computing system 1900 and an example of a networked system 1910. A system such as the system 1700 of FIG. 17, the system 560 of FIG. 5, etc., may include one or more of the features of the system 1900 and/or the system 1910. The system 1900 includes one or more processors 1902, memory and/or storage components 1904, one or more input and/or output devices 1906 and a bus 1908. In an example embodiment, instructions may be stored in one or more computer-readable media (e.g., memory/storage components 1904). Such instructions may be read by one or more processors (e.g., the processor(s) 1902) via a communication bus (e.g., the bus 1908), which may be wired or wireless. The one or more processors may execute such instructions to implement (wholly or in part) one or more attributes (e.g., as part of a method). A user may view output from and interact with a process via an I/O device (e.g., the device 1906). In an example embodiment, a computer-readable medium may be a storage component such as a physical memory storage device, for example, a chip, a chip on a package, a memory card, etc. (e.g., a computer-readable storage medium).

In an example embodiment, components may be distributed, such as in the network system 1910. The network system 1910 includes components 1922-1, 1922-2, 1922-3, . . . 1922-N. For example, the components 1922-1 may include the processor(s) 1902 while the component(s) 1922-3 may include memory accessible by the processor(s) 1902. Further, the component(s) 1902-2 may include an I/O device for display and optionally interaction with a method. The network may be or include the Internet, an intranet, a cellular network, a satellite network, etc.

As an example, a device may be a mobile device that includes one or more network interfaces for communication of information. For example, a mobile device may include a wireless network interface (e.g., operable via IEEE 802.11, ETSI GSM, BLUETOOTH™, satellite, etc.). As an example, a mobile device may include components such as a main processor, memory, a display, display graphics circuitry (e.g., optionally including touch and gesture circuitry), a SIM slot, audio/video circuitry, motion processing circuitry (e.g., accelerometer, gyroscope), wireless LAN circuitry, smart card circuitry, transmitter circuitry, GPS circuitry, and a battery. As an example, a mobile device may be configured as a cell phone, a tablet, etc. As an example, a method may be implemented (e.g., wholly or in part) using a mobile device. As an example, a system may include one or more mobile devices.

As an example, a system may be a distributed environment, for example, a so-called "cloud" environment where various devices, components, etc. interact for purposes of data storage, communications, computing, etc. As an example, a device or a system may include one or more components for communication of information via one or more of the Internet (e.g., where communication occurs via one or more Internet protocols), a cellular network, a satellite network, etc. As an example, a method may be implemented in a distributed environment (e.g., wholly or in part as a cloud-based service). As an example, a framework such as the TECHLOG® framework for petrophysics may be implemented at least in part in a cloud environment. For example, the induction tool system 1700 of FIG. 17 may be operatively coupled to cloud resources (e.g., network equipment, compute equipment, memory devices, etc.).

As an example, a mobile device may be configured with a browser or other application (e.g., app, etc.) that can operatively couple to cloud resources and, for example, optionally to local resources (e.g., equipment at a rig site, wireline site, etc.). For example, a system can include performing computations locally and/or remotely where rendering of a log or logs may occur locally and/or remotely. Remote rendering may be to a mobile device where, for example, a user can see, optionally in real time, maturity values for a formation or formations, which may be from induction measurements acquired in one or more boreholes and processed by a system such as a system that includes one or more features of the induction tool system 1700 of FIG. 17, the system 560 of FIG. 5, the system 400 of FIG. 4, etc.

As an example, information may be input from a display (e.g., consider a touchscreen), output to a display or both. As an example, information may be output to a projector, a laser device, a printer, etc. such that the information may be viewed. As an example, information may be output stereographically or holographically. As to a printer, consider a 2D or a 3D printer. As an example, a 3D printer may include one or more substances that can be output to construct a 3D object. For example, data may be provided to a 3D printer to construct a 3D representation of a subterranean formation. As an example, layers may be constructed in 3D (e.g., horizons, etc.), geobodies constructed in 3D, etc. As an example, holes, fractures, etc., may be constructed in 3D (e.g., as positive structures, as negative structures, etc.).

Although only a few example embodiments have been described in detail above, those skilled in the art will readily appreciate that many modifications are possible in the example embodiments. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph 6 for any limitations of any of the claims herein, except for those in which the claim expressly uses the words "means for" together with an associated function.

What is claimed is:

1. A method for logging a borehole penetrating a subterranean formation, the method comprising:
    deploying an induction logging tool in the borehole, the induction logging tool including at least one transmitter coil and at least one receiver coil;
    causing the transmitter coil to transmit electromagnetic energy into the formation, said transmitted electromagnetic energy inducing a voltage response in the receiver coil;
    processing the voltage response via a mathematical inversion to compute a dielectric constant of the formation; and
    processing said computed dielectric constant of the formation to estimate a kerogen maturity index of the formation, said kerogen maturity index being indicative of a hydrocarbon bearing potential of the formation.

2. The method of claim 1 further comprising generating a log of the kerogen maturity index, said log being rendered to display the kerogen maturity index with respect to a position of the induction logging tool in the borehole.

3. The method of claim 1 wherein the transmitter coil transmits the electromagnetic energy at a frequency that is a resonant frequency of the formation, the resonant frequency depending on characteristics of particles in the formation.

4. The method of claim 1 further comprising determining a stimulation operation based on the estimated kerogen maturity index and performing the stimulation operation during a subsequent fracturing operation.

5. The method of claim 1, wherein said estimated kerogen maturity index increases with increasing values of said computed dielectric constant.

6. The method of claim 1, wherein said processing said computed dielectric constant of the formation comprises using a fitting function that relates the kerogen maturity index to the dielectric constant of the formation.

7. The method of claim 1, further comprising obtaining a graphite to kerogen ratio of the formation and wherein said processing said computed dielectric constant of the formation comprises using a fitting function that relates the kerogen maturity index to the dielectric constant of the formation and the graphite to kerogen ratio of the formation.

8. The method of claim 7 wherein the fitting function relates the kerogen maturity index to a logarithm of the dielectric constant of the formation and the graphite to kerogen ratio of the formation.

9. The method of claim 1, further comprising:
    deploying a gamma ray spectroscopy logging tool in the borehole;
    causing the gamma ray spectroscopy logging tool to make gamma ray spectroscopy measurements of the formation; and
    processing the gamma ray spectroscopy measurements to compute a graphite to kerogen ratio of the formation,
    wherein processing said computed dielectric constant of the formation further comprises processing said computed dielectric constant of the formation and said computed graphite to kerogen ratio of the formation to estimate the kerogen maturity index of the formation.

10. The method of claim 1, wherein the kerogen maturity index correlates to a vitrinite reflectance of the formation.

11. The method of claim 1, wherein the transmitter coil is a z-axis transmitter coil and the receiver coil is a z-axis receiver coil.

12. The method of claim 1, wherein the induction logging tool is a triaxial induction logging tool.

13. The method of claim 12, wherein the transmitter coil is an x-axis transmitter coil and the receiver coil is a x-axis receiver coil.

14. The method of claim 1, wherein:
    the voltage response includes in-phase and out-of-phase voltage components; and
    processing the voltage response comprises processing the in-phase and the out-of-phase voltage components of the voltage response via a mathematical inversion to compute a dielectric constant of the formation.

15. A system comprising:
    an induction logging tool configured for deployment in a borehole penetrating a subterranean formation, the induction logging tool including at least one transmitter coil and at least one receiver coil, the transmitter coil configured to transmit electromagnetic energy into the formation thereby inducing a voltage response in the receiver coil;

a processor;

memory accessibly by the processor; and instructions stored in the memory and executable by the processor to instruct the system to (i) process the voltage response via a mathematical inversion to compute a dielectric constant of the formation, and (ii) process said computed dielectric constant of the formation to estimate a kerogen maturity index of the formation, wherein the kerogen maturity index is indicative of a hydrocarbon bearing potential of the formation.

16. The system of claim 15 further comprising:

a gamma ray spectroscopy logging tool configured for deployment in the borehole and configured to make gamma ray spectroscopy measurements of the formation;

wherein the instructions instruct the system to (ia) process the voltage response via a mathematical inversion to compute a dielectric constant of the formation, (ib) process the gamma ray spectroscopy measurements to compute a graphite to kerogen ratio of the formation, and (ii) process said computed dielectric constant of the formation and the graphite to kerogen ratio of the formation to estimate a kerogen maturity index of the formation.

17. The system of claim 16, wherein the instructions instruct the system to compute the dielectric constant of the formation using a fitting function that relates the kerogen maturity index to the dielectric constant of the formation and the graphite to kerogen ratio of the formation.

18. The system of claim 17 wherein the fitting function relates the kerogen maturity index to a logarithm of the dielectric constant of the formation and the graphite to kerogen ratio of the formation.

19. The system of claim 16, wherein the induction logging tool and the gamma ray spectroscopy logging tool are co-deployed on a tool string which is in turn deployed in the borehole.

20. The system of claim 15, wherein the instructions instruct the system to compute the dielectric constant of the formation using a fitting function that relates the kerogen maturity index to the dielectric constant of the formation.

* * * * *